United States Patent
Pai et al.

(10) Patent No.: US 11,610,085 B2
(45) Date of Patent: Mar. 21, 2023

(54) PROTOTYPE-BASED MACHINE LEARNING REASONING INTERPRETATION

(71) Applicant: ADOBE INC., San Jose, CA (US)

(72) Inventors: Deepak Pai, Santa Clara, CA (US); Debraj Debashish Basu, Los Angeles, CA (US); Joshua Alan Sweetkind-Singer, San Jose, CA (US)

(73) Assignee: ADOBE INC., San Jose, CA (US)

( * ) Notice: Subject to any disclaimer, the term of this patent is extended or adjusted under 35 U.S.C. 154(b) by 1058 days.

(21) Appl. No.: 16/289,520

(22) Filed: Feb. 28, 2019

(65) Prior Publication Data

US 2020/0279140 A1    Sep. 3, 2020

(51) Int. Cl.
*G06K 9/62* (2022.01)
*G06N 20/00* (2019.01)
*G06F 11/30* (2006.01)

(52) U.S. Cl.
CPC ........ *G06K 9/6276* (2013.01); *G06F 11/3086* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,558,913 | B1 * | 2/2020 | Turner | G06N 3/082 |
| 2002/0180805 | A1 * | 12/2002 | Chickering | G06Q 30/02 |
| | | | | 715/812 |
| 2014/0229162 | A1 * | 8/2014 | Kim | G06F 40/30 |
| | | | | 704/9 |
| 2018/0322406 | A1 * | 11/2018 | Merrill | G06N 20/00 |
| 2019/0354805 | A1 * | 11/2019 | Hind | G06N 5/045 |

* cited by examiner

*Primary Examiner* — Qing Chen
(74) *Attorney, Agent, or Firm* — Shook, Hardy, Bacon, L.L.P.

(57) ABSTRACT

In some examples, a prototype model that includes a representative subset of data points (e.g., inputs and output classifications) of a machine learning model is analyzed to efficiently interpret the machine learning model's behavior. Performance metrics such as a critic fraction, local explanation scores, and global explanation scores are determined. A local explanation score capture an importance of a feature of a test point to the machine learning model determining a particular class for the test point and is computed by comparing a value of a feature of a test point to values for prototypes of the prototype model. Using a similar approach, global explanation scores may be computed for features by combining local explanation scores for data points. A critic fraction may be computed to quantify a misclassification rate of the prototype model, indicating the interpretability of the model.

20 Claims, 12 Drawing Sheets

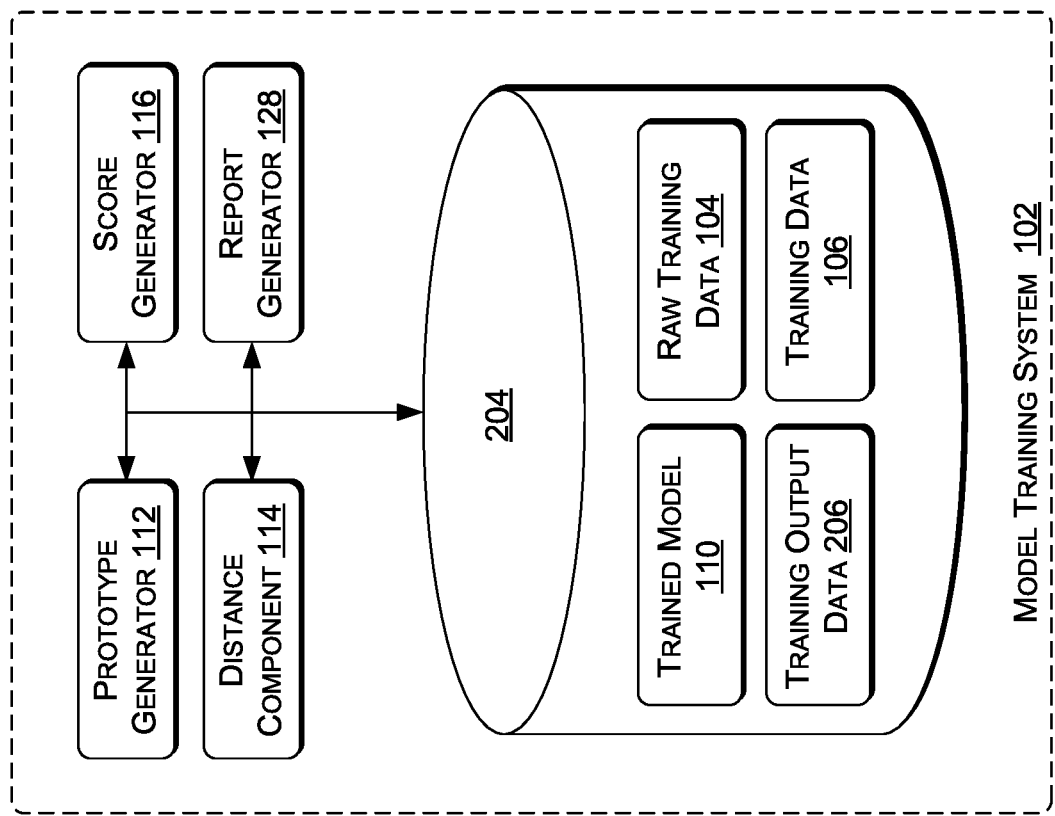

US 11,610,085 B2

1

PROTOTYPE-BASED MACHINE LEARNING REASONING INTERPRETATION

BACKGROUND

An increasing number of industries rely on machine learning systems in production environments to learn from, classify, respond to, and/or otherwise use vast amounts of incoming data. Despite the often critical role of machine learning systems in these production environments, computer functionality for decoding or interpreting how these systems make a decision are either absent or lack effectiveness. For example, although some conventional machine learning models, such as neural networks, can classify data exceptionally well, they typically lack transparency into their inner workings for explaining how classifications are made. This makes these models so-called "black box" models. This is problematic because it may be difficult to identify potential biases affecting the decisions and can lead to overfitting amongst other problems, which can affect classifications for new incoming data. Consequently, irrelevant or noisy features may be used for making classifications. These problems can be catastrophic for certain applications, as determinations made by these models can profoundly impact people's lives.

Some approaches exist for attempting to understand the behavior of machine learning models by analyzing all of the inputs and associated outputs of the machine learning models. However, it is computationally inefficient to analyze all the inputs and associated outputs of the machine learning models because of the need to process and store noisy and redundant dimensions or data points. As a result, existing computing systems may significantly consume computing resources, such as CPU, memory, and network latency.

SUMMARY

Embodiments of the present disclosure relate to approaches for understanding and interpreting the classifications made by machine learning models, such as neural networks. The disclosure provides a model-agnostic framework for explaining the classifications made by a machine learning model (MLM) in a computationally efficient and easy to understand manner. To do so, particular data points of the MLM (e.g., inputs to the MLM and the resulting output classifications made by the MLM) are selected as prototypes for a prototype model, each may represent a particular class of output from the MLM. To understand how important a particular feature is to the MLM predicting a particular class (e.g., a denial of a loan) for a data point (e.g., a user's loan application), a value of the feature for the data point can be compared/contrasted to values of the feature of prototypes of different classes. In particular, a local explanation score for the data point may be computed by determining a level of similarity between the value of the data point and a value of a prototype that has the same class as the data point (e.g., a denial of a loan) and between a value of a prototype that has a different class (e.g., an approval of a loan) than the data point. Local explanation scores for many data points can be combined to form a global explanation score that explains overall importance of the feature to classifications made by the MLM. A critic fraction may also be computed to quantify a misclassification rate of the prototype model, indicating the interpretability of the model. Reports may be generated from the explanation scores and/or critic fraction so that users of the MLM can understand the impact of various features (e.g., a user's credit score) on a particular decision (e.g., rejected a user's loan application) made by the MLM or an administrator can ensure the MLM is performing as expected.

BRIEF DESCRIPTION OF THE DRAWINGS

The present systems and methods for prototype-based machine learning model reasoning interpretation is described in detail below with reference to the attached drawing figures, wherein:

FIG. 2A is a block diagram depicting an example of a model training system in accordance with some embodiments of the present disclosure;

DETAILED DESCRIPTION

Figure 1A:
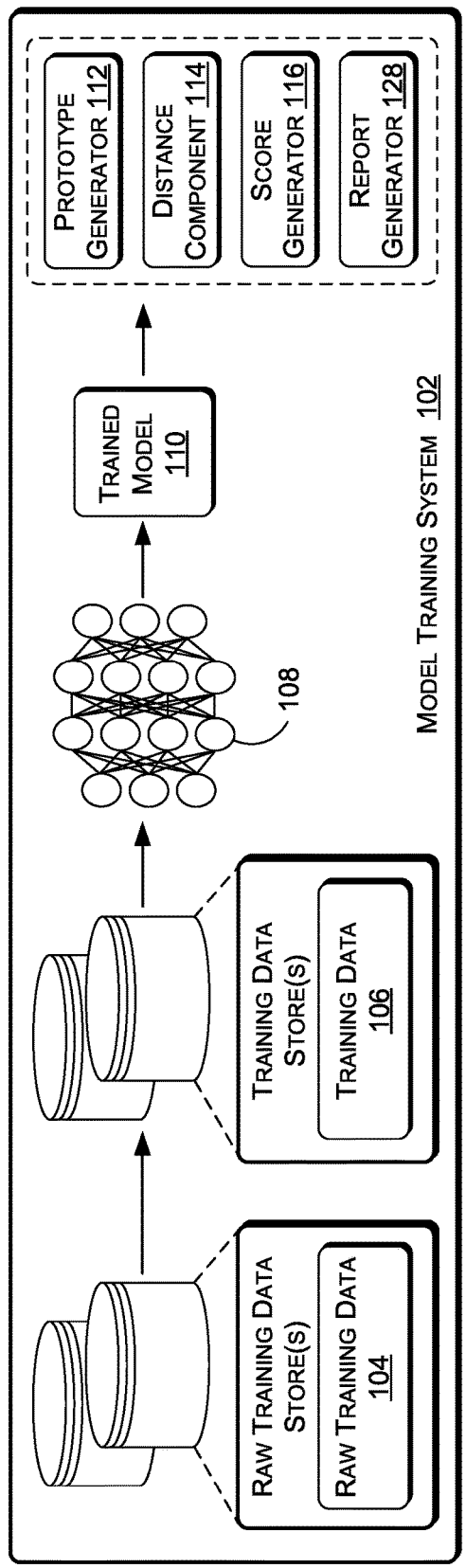
FIG. 1A is an example system diagram of a model training system in accordance with some embodiments of the present disclosure.

Existing technologies used by computing systems lack the functionality to provide robust explanations for determinations made by machine learning models in an efficient manner. Various conventional technologies use partial dependence plots, residual analysis machine learning models, or generalized additive machine learning models to understand model behavior. However, some of these technologies rely on response functions to be monotonically constrained by the particular classifications that are made in order to explain model behavior. This means classification boundaries must be uniform and symmetrical for correctly interpreting the behavior of a machine learning model. But when the response functions are non-monotonically constrained, these technologies are often inaccurate in understanding model behavior. For example, if one were to model survival of Titanic passengers, very young and elderly people had higher chances of survival than middle aged men and women. This may cause classification clusters to be very asymmetrical and non-uniform, resembling a non-monotonic response function. Many conventional technologies do not provide a framework for understanding this type of model behavior, which is often exhibited by neural networks.

Some conventional behavioral models, such as surrogate behavioral models, employ simple models, such as a linear model, a decision tree, or a decision list data structure that is trained from input/output pairs generated by the machine learning model itself. A shortcoming in using surrogate models is that a large and complex model is used to avoid the lack of robust prediction accuracy incurred by using a simpler model. Decision trees and decision list data structures, for example, often become complex to the point where they sacrifice explanatory power. As a decision tree grows (e.g., it adds more leaf nodes and decisions), it becomes more complex, rendering it increasingly less useful as an explanation. Moreover, variables used in root or branch node splits in a decision tree are fixed, implying that their values are always the most relevant in providing an explanation for the machine learning model's classification output. However, this is not always the case, making the computer unable to accurately explain certain behaviors of the model that are prone to change over time.

Various embodiments of the present disclosure allow for the shortcomings of each of these existing computer technologies to be overcome via analyzing the behavior of a prototype model that includes a representative subset of data points of a machine learning model. The subset of data points included in a prototype model (also referred to as prototypes) collectively mimic or capture the overall classification behavior of the machine learning model. Thus, the prototype model can be analyzed to efficiently interpret the machine learning model's behavior or performance. This allows for greater accuracy and less resource consumption in analyzing machine learning model behavior.

The present disclosure provides for explanation scores that may be generated by analyzing the prototype model and that indicate how important particular features are to a machine learning model determining a particular class for a set of input feature values. The explanation scores can be used to rank the relative importance of different features to the classifications made by the machine learning model. Thus, the explanation scores can be used to understand the behavior of the machine learning model. Examples of the explanation scores include local explanation scores and global explanation scores.

Embodiments of the present disclosure relate to approaches for understanding and interpreting the classifications made by machine learning models, such as neural networks. The disclosure provides a model-agnostic framework for explaining the classifications made by a machine learning model (MLM) in a computationally efficient and easy to understand manner. To do so, particular data points of the MLM (e.g., inputs to the MLM and the resulting output classifications made by the MLM) are selected as prototypes for a prototype model, each may represent a particular class of output from the MLM. To understand how important a particular feature is to the MLM predicting a particular class (e.g., a denial of a loan) for a data point (e.g., a user's loan application), a value of the feature for the data point can be compared/contrasted to values of the feature of prototypes of different classes. In particular, a local explanation score for the data point may be computed by determining a level of similarity between the value of the data point and a value of a prototype that has the same class as the data point (e.g., a denial of a loan) and between a value of a prototype that has a different class (e.g., an approval of a loan) than the data point. Local explanation scores for many data points can be combined to form a global explanation score that explains overall importance of the feature to classifications made by the MLM. A critic fraction may also be computed to quantify a misclassification rate of the prototype model, indicating the interpretability of the model. Reports may be generated from the explanation scores and/or critic fraction so that users of the MLM can understand the impact of various features (e.g., a user's credit score) on a particular decision (e.g., rejected a user's loan application) made by the MLM or an administrator can ensure the MLM is performing as expected. A "local explanation score" may be indicative of an importance of a value(s) of a feature(s) of a test point to the test point being included in a particular class by a machine learning model. For example, a test point, which may correspond to a particular plant, may have 4 different features (also known as attributes)-sepal length, sepal width, petal length, and petal width. Various aspects of the present disclosure generate a local explanation score in order to, for example, indicate that the feature value for "petal length" is the most important feature for classifying the plant as a Setosa iris plant using a machine learning model.

A local explanation score may be computed by comparing the value of the feature of the test point to values of prototypes of the prototype model. For example, a local explanation score may be based on comparing values of the test point to the most similar prototype of the same class as the test point and the most similar prototype of a different class (e.g., using the difference between values for the feature). Local explanation scores may be computed for any number of input features of the test point and used to rank the relative importance of the features to the test point being included in the class.

A "global explanation score" may be indicative of an importance of a value(s) of a feature(s) to classifications made by a machine learning model. A global explanation score captures the behavior of many prototypes of a prototype model with respect to one or more particular features. A global explanation score may be computed by combining local explanation scores for multiple prototypes of the prototype model, such as by computing an average. In some examples, the local explanation scores for particular prototypes are weighted in determining a global explanation score. A weight value for a prototype may correspond to a quantity of data points of the machine learning model that were condensed into the prototype (e.g., using a coverage calculation when generating the prototype model). In this way a global explanation score may capture original data point density for various regions to weight an importance of a feature or feature value with respect to the classifications made by the machine learning model.

To illustrate a global explanation score using the example above, although it may be determined that "petal length" was the most important factor for making a classification based on the local explanation score for the particular plant, this factor may be less significant than other features in how the machine learning model makes classifications at a global level. Accordingly, after generating a global explanation score, the local explanation score for petal length may viewed with additional context. Examples of generating global and local explanation scores are described in more detail herein.

Thus, the behavior of a machine learning model can be analyzed using a relatively small, but representative group of prototypes that collectively captures the behavior of the machine learning model. This results in an efficient use of valuable processing time and storage, without unnecessarily consuming computing resources. In contrast, existing computing technologies require inefficient data structures and multiple dimensions of data points in vector space to be stored and processed. This wastes valuable processing time and storage, by unnecessarily consuming computing resources. For example, these systems may increase storage device I/O (e.g., excess physical read/write head movements on non-volatile disk), increase network utilization, and cause excessive CPU cycles. This is because existing approaches may rely on thousands or more of data points in vector space (e.g., all of the data used to train a machine learning model), which are not guaranteed to be stored locally. Each vector can have multiple dimensions. When a prediction needs to be generated, each of these data point vectors and their features may be analyzed to make behavior predictions. Accordingly, for each data point of the thousands or more data points analyzed, CPU instruction cycles (e.g., fetch, decode, read, execute) are used, which can quickly tax CPUs and cause significant computing latency. Moreover, when these various data points are stored across different remote storage devices (e.g., within a storage area network (SAN)), the computing system may have to traverse a network and reach out to a storage device to perform a read or write operation for each data point or set of data points. This is time consuming, error prone, leaves less bits available to be transmitted for a particular time slice (i.e., there is reduced bandwidth), and can eventually wear on components, such as a read/write head because of the many dimensional data points that have to be located in storage across a network and analyzed. Reaching out to disk is also very expensive because of the address location identification time and mechanical movements required of a read/write head. Moreover, the simple data structures described above unnecessarily consume large quantities of memory and storage.

Various terms are used throughout, some of which are described below:

A "data point" (e.g., a test point, test data point, or prototype) may refer to a set of input feature values that a machine learning model may use to determine a classification (a data point may further be associated with a label that corresponds to the classification). The set of input feature values may be represented using a feature vector. Each feature vector may capture multiple features and include corresponding values that may be used as inputs to the machine learning model and can be represented in vector space or feature space. For example a data point may represent a particular plant (e.g., a Setosa iris plant). The features (also known as attributes) of the plant can represent petal width, petal length, sepal width, sepal length, etc. The values of each feature may be petal width: 1.4, petal length: 2.0, sepal width: 2.3, sepal length 3.6, etc. In some aspects, the "values" of features additionally or alternatively correspond to the features themselves, such as Boolean values (True, False, 0, 1) indicating whether a feature is present or not for the test point. For example, a test point may include feature "whiskers," but if the test point (e.g., a dog) does not have whiskers, the value would be 0 or false. In some examples, a data point corresponds to tabular data (e.g., data contained in a table) or other data that is convertible to vector(s) (e.g., integers) or sub-images of a larger image. In this way, data such as database strings or images, can be converted into vectors for representation within vector space.

A "test point" may refer to a data point that is evaluated with respect to a prototype model of a machine learning model, such as to determine feature relevancy or importance with respect to the test point being included in a particular class by the machine learning model. A test point may or may not be a prototype in the prototype model. Further, a test point may or may not be included in the data points that were condensed or consolidated into the prototype model.

A "prototype model" may refer to a behavioral model of prototypes that is configured to be used to interpret the behavior of one or more machine learning models. The prototypes may be data points, which may be generated by condensing a larger set of data points, such as training data of a machine learning model, while retaining critical properties of the original data. These properties capture the behavior of the machine learning model in making classifications, such as by capturing output distributions of the machine learning model. A prototype model may be used to interpret how or why a particular machine learning model made a particular classification (e.g., illustrate which features were the most relevant for making a classification), or which features are the most important in making classifications at a global level.

A "prototype" may refer to a particular unit of information or data point that is a condensed or compressed representation of a larger set of data points of a machine learning model. For example, every data point within the same neighborhood (e.g., a group of data points within a threshold distance of each other) maybe compressed to be represented as a single data point in a prototype model. Each prototype together in a prototype model (e.g., a classification output of only prototypes) may substantially resemble all the data points in terms of model behavior, such as by maintaining the output distribution of the machine learning model as closely as possible with local variability in both label space and feature space, but with fewer data points. In some examples, a group of prototypes represent a subgroup or condensed version of the data points.

An "Ally" or Ally data point may refer to a prototype that shares the same class as a test point. In some examples, an ally may be selected based on being the closest (e.g., via Euclidian distance) prototype to the test point (e.g., a test data point or another prototype). An "Adversary" or Adversary data point may refer to a prototype that has a different class as a test point. In some examples, an adversary may be selected based on being the closest (e.g., via Euclidian distance) prototype to the test point (e.g., a test data point or another prototype). In some examples, a local explanation score for a test point is determine based on comparing a value of the test point to values of one or more Allies or Adversaries (e.g., only the closest of each).

Figure 1B:
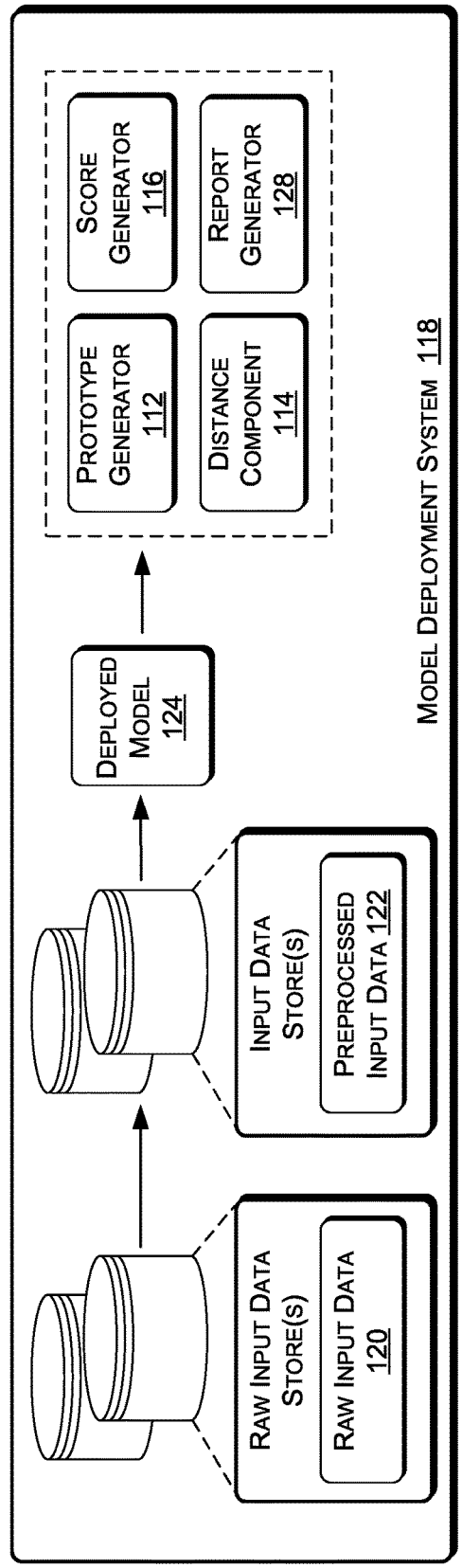
FIG. 1B is an example system diagram of a model deployment system in accordance with some embodiments of the present disclosure.

With reference to FIG. 1A and FIG. 1B, reference to input data or data points may include raw training data 104, training data 106, raw input data 120, and/or preprocessed input data 122. Reference to output data may include data output by a trained model 110 (e.g., training output data 206 of FIG. 2A) and/or a deployed model 124 (e.g., output data 212 of FIG. 2B) used to classify the input data. Reference to performance may include the performance of the trained model 110 and/or the deployed model 124. The deployed model 124 may refer to the trained model 110 in a deployed environment of a computing system and/or application.

Referring now to FIG. 1A, a schematic depiction is provided illustrating an example model training system 102 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The model training system 102 may include, among other things, a raw training data store(s) including raw training data 104, a training data store(s) including training data (e.g., after preprocessing the raw training data 104), a training component 108, a trained model 110, an prototype generator 112, an distance component 114, and/or a score generator 116. The model training system 102 (and the components and/or features thereof) may be implemented using one or more computing devices, such as the computing device 1100 of FIG. 7, described in more detail below.

The raw training data 104 may include any type of raw data that may be used by the training component 108 to generate the trained model 110. The raw training data 104 may be collected, generated, and/or obtained from any number of sources, such as files, databases, data stores, sensors, and/or other sources of structured, semi-structured, or non-structured data. In some examples, the raw training data 104 may be used directly by the training component 108 (e.g., without preprocessing), such as when the training component 108 is training a convolutional neural network (CNN). In such examples, the training data store(s) and the accompanying training data 106 may not be included in the model training system 102. In some examples, a combination of the raw training data 104 and the training data 106 may be used by the training component 108 to generate the trained model 110. In other examples, the training component 108 may only use the training data 106 for generating the trained model 110. In other words, the raw training data 104, the training data 106, or a combination thereof may be used by the training component 108 to generate the trained model 110.

The training data 106 may include the raw training data 104 after preprocessing. For example, data preprocessing may be performed by the model training system 102 to convert the raw training data 104 into a clean (e.g., useable) data set (e.g., the training data 106). For example, the raw training data 104 may be collected, generated, and/or obtained in a raw format, which may not be feasible, effective, or usable by the training component 108 for generating the trained model 110. In addition, the raw training data 104 may include inaccurate or missing data (e.g., as a result of gaps in data collection, mistakes in data entries, technical problems with sensors, such as biometric sensors, and the like), noisy data (e.g., erroneous data or outliers), and/or inconsistent data (e.g., duplication of data, human data entry errors, mistakes in codes, etc.).

During preprocessing, the raw training data 104 may undergo various processes, such as data cleaning, data integration, data transformation, data reduction, and/or the like. For example, when the raw training data 104 includes inaccurate or missing data, the rows with missing data may be ignored (or deleted) when generating the training data 106 (in examples where the number of missing values is not too large), the missing data may be manually filled (in examples where the number of missing values is not too large to create an unreasonable task), and/or the missing values may be filled using computed values. For examples, to fill the missing values using computed values, the mean, mode, or median of the existing raw training data 104 could be used in place of the missing values. As another example, a machine learning model can be implemented to generate predictive values for the missing values of the raw training data 104.

When the raw training data 104 includes noisy data, the data preprocessing may include data binning, clustering, employing a machine learning model, and/or manual removal. For example, substantially continuous data from the raw training data 104 can be grouped together into a smaller number of "bins" (e.g., if the raw training data 104 includes every age from 0-100, the ages may be "binned" into groups of ages at five year intervals). As another example, similar data may be grouped together (e.g., into the same cluster or class), and/or a machine learning model (such as a regression algorithm) may be used to smooth the raw training data 104. In some examples, the noisy data can be deleted manually.

In some examples, after preprocessing, the raw training data 104 (and/or the training data 106) may undergo data wrangling (or data munging). For example, the training component 108 may use data wrangling during the training process of generating the trained model 110. Data wrangling may be used to transform and/or map the raw training data 104 into a different format that is more appropriate and/or valuable for downstream purposes (e.g., analytics). For example, as the training component 108 is training the model (e.g., after one or more iterations), a different format for the one or more types of the raw training data 104 (and/or training data 106) may be determined to be more suitable for downstream purposes than the format that is currently being used. By reformatting the raw training data 104 (and/or the training data 106), analysis of the input data, output data, and/or performance of the trained model 110 (and/or the deployed model 124 of FIG. 1B) may be more effective. In an example illustration, strings of words corresponding to a feature (e.g., sepal width) can be changed to a real number (e.g., 0 or 1) to be represented as a feature value in vector space.

The training component 108 may use the raw training data 104 and/or the training data 106 to generate the trained model 110. Although the training component 108 of FIG. 1A includes a general illustration of a neural network, this is not intended to be limiting. For example, the training component 108 may be used to train any type of machine learning model, such as machine learning models using linear regression, logistic regression, decision trees, support vector machine (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short terms memory, Hopfield, Boltzmann, deep belief, deconvolutional, generative adversarial, liquid state machine, etc.), and/or other types of machine learning models.

The trained model 110 may be generated by the training component 108 using the raw training data 104 and/or the training data 106. The trained model 110 may include one or more models, such as A/B models that are tested. Once it is determined that the trained model 110 has acceptable accuracy, the trained model 110 may be deployed (e.g., as the deployed model 124). The determination that a trained model 110 has acceptable accuracy or confidence may include a threshold accuracy, such as, for example and without limitation, 80%, 90%, 98%, etc. The threshold accuracy may be predefined by the model training system 102, or may be user defined.

The trained model 110 may be analyzed during training, after training, and/or after deployment (e.g., as the deployed model 124 of FIG. 1B) to evaluate the behavior of the trained model 110. The analysis may be performed by a prototype generator 112, a distance component 114, and/or a score generator 116. The prototype generator 112 may be used to determine prototypes of the trained model 110 that form a prototype model. When evaluating test points with respect to the prototype model, the distance component 114 may be used by the score generator 116 to select prototypes of the same class as the test points based on distances between values of features between the prototypes and the test points. The distance component 114 may also be used by the score generator 116 to select prototypes of a different class as the test points based on distances between values of the features between the prototypes and the test points. The score generator 116 may be used to generate explanation scores using the test points and selected prototypes, such as local and/or global explanation scores. The report generator 128 may generate one or more reports and/or provide (e.g., over a computer network) a user interface to a client device, such that a user can view the one or more explanation scores and/or other information or metrics that give insight associated with feature importance or relevance. Thus, the user may determine whether the training model 110 is behaving properly and is suitable to be deployed, whether to further train the model to achieve more desirable behavior, or whether to redesign the trained model 110.

Although various different performance metrics (e.g., explanation scores) are described herein with respect to performance of machine learning models, this is not intended to be limiting.

The prototype generator 112, distance component 114, score generator 116, and report generator 128 may be all components used to generate and analyze a prototype model in some examples. In various examples, these components process data after the data has been processed by a machine learning model (e.g., the trained model 110 and/or the deployed model 124).

Figure 3A:
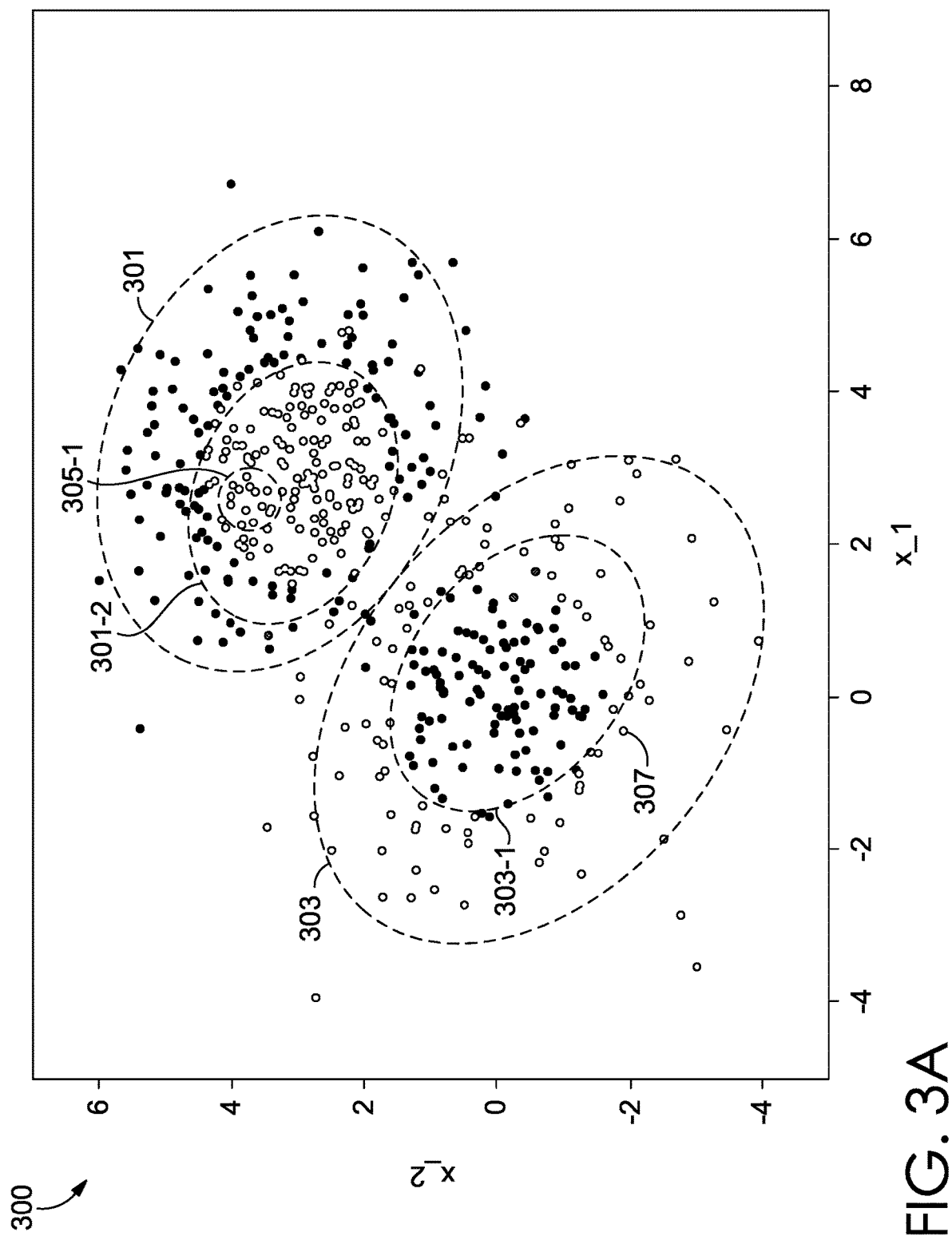
FIG. 3A is a schematic diagram of a machine learning model output of classifications within vector space, in accordance with some embodiments of the present disclosure.
Figure 3B:
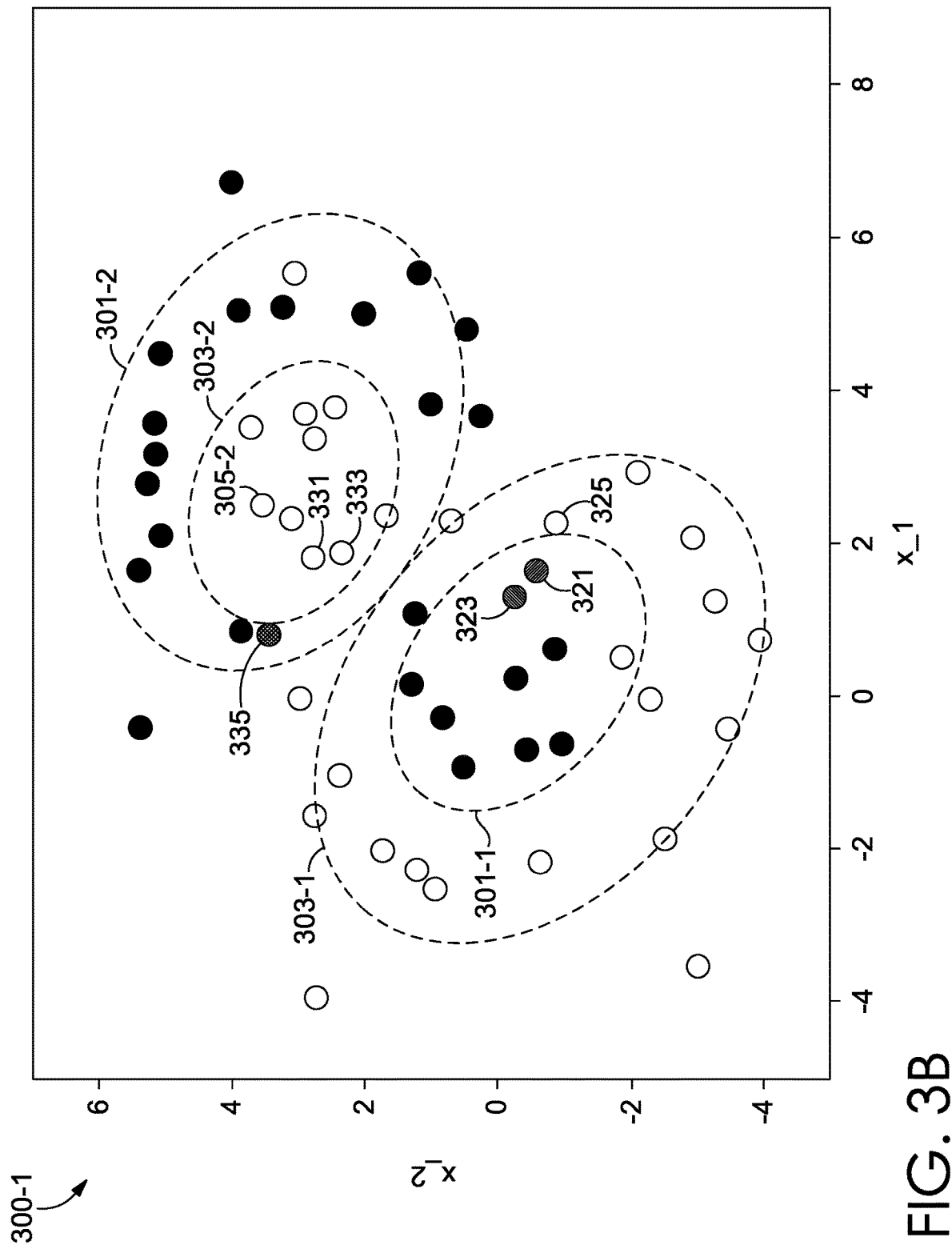
FIG. 3B is a schematic diagram of a prototype machine learning model output of classifications within vector space in accordance with some embodiments of the present disclosure.
Figure 8:
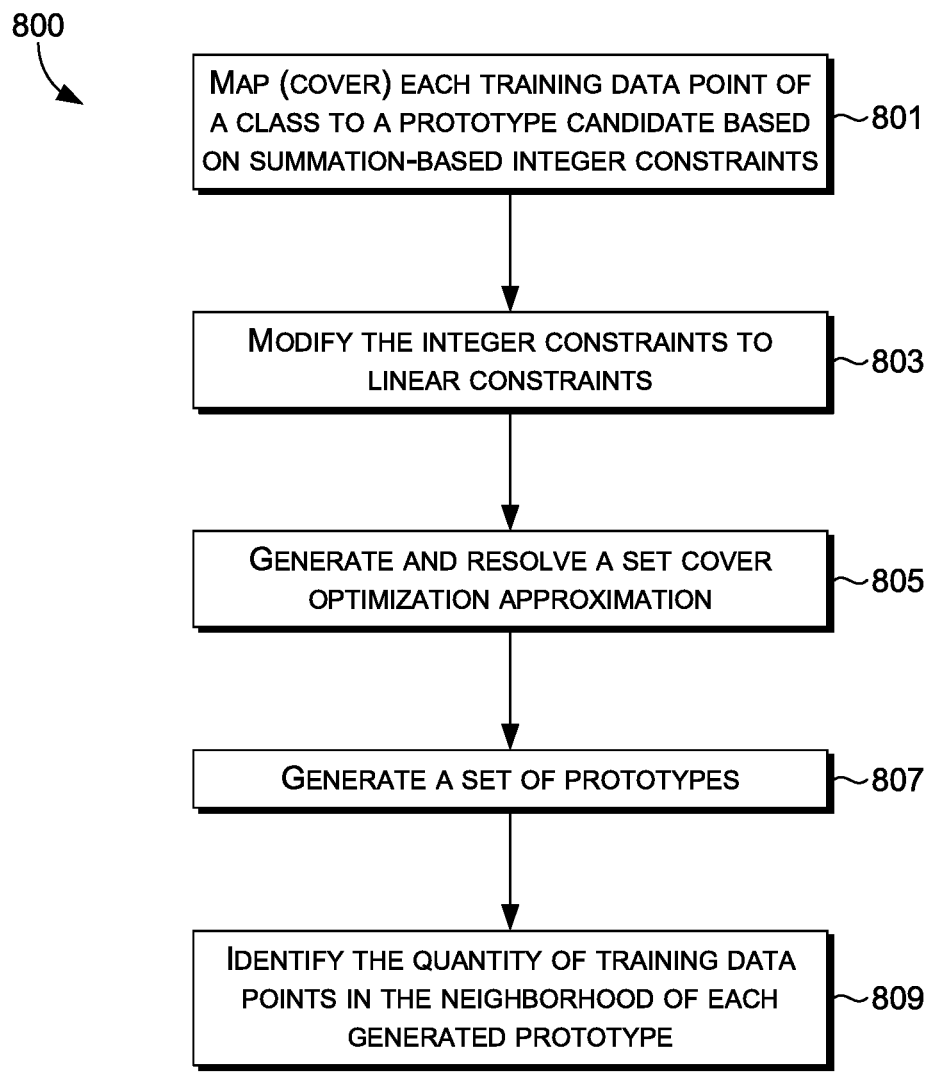
FIG. 8 is a flow diagram of an example process for generating a set of prototypes, in accordance with some embodiments of the present disclosure.

The prototype generator 112 generates prototypes, each of which may be a sub group, condensed, or compressed version of other data points used as inputs in a machine learning model (e.g., data points used for training the trained model 110 and/or used for testing the trained model 110). For example, there may be 1000 data points (e.g., the data 104, 106, 120, and/or 122) used as inputs to a machine learning model (e.g., the trained model 110 and/or the deployed model 124). The prototype generator 112 may generate 100 data points, which may be representative (e.g., in terms of data distribution, orientation in vector space, etc.) of the 1000 data points in vector space. Generally, the number of data points that are used to generate a prototype model should be sufficient to ensure that the behavior of the machine learning model is collectively captured by the data points and the corresponding classifications of the data points made by the machine learning model. FIG. 8 and process 800 are used to describe an example of an approach that may be used by the prototype generator 112 to generate a prototype model. FIG. 3A illustrates an example of the data points and FIG. 3B illustrates an example of a prototype model that may be generated from the data points.

The distance component 114 determines the distance between one or more prototypes and one or more test points (e.g., a data point of the data 104, 106, 120, and/or 122) and the score generator 116 may use the distance(s) to determine Allies and Adversaries for the test point(s) in order to use the Allies and Adversaries to generate explanation scores for the test point(s). For example, the distance component 114 can measure the Euclidian distance in vector space between a test point and each prototype in order for the score generator 116 to determine which prototype is an Ally and which prototype is an Adversary based on the distances to the prototypes and the classes of the prototypes. The score generator may then compare values of an input feature between the test point, the Ally of the test point, and the Adversary of the test point to generate an explanation score for the input feature.

The score generator 116 may generate one or more explanation scores, which may be indicative of an importance or relevance of a feature with respect to classifications made by the machine learning model. For example, the score generator 116 may generate a local explanation score for a given test point and a global explanation score for a given feature or features by aggregating several local explanation scores for several test points (e.g., prototypes). As mentioned herein, an explanation score for a test point may be computed using prototypes that are selected by the score generator 116 based on the distances to those prototypes that are determined using the distance component 114.

The report generator 128 may generate one or more reports and/or provides (e.g., over a computer network) a user interface to a client device, such that a user can view the one or more explanation scores and/or other information or metrics that give insight associated with feature importance or relevance. For example, after a first few rounds of training, the model training system 102 may cause a user interface to be displayed to a client device, which graphically illustrates local and/or global explanation scores for each feature of one or more classes or test points. In this way, for example, a machine learning model developer can visually identify any potential biases or other problems in the data such that the machine learning model can be modified if needed (e.g., via more rounds of training or starting a new training data set).

In some examples, the report generator 128 may generate the reports persistently, at intervals, upon user request, and/or at another cadence. The reports may be generated based at least in part on user programs, such as one report a day, one report a week, one report a month, etc. The reports may be transmitted to a client device(s) associated with users of the models (e.g., the trained model 110 and/or the deployed model 124). For example, the reports may be included in messages (e.g., signals) that may be transmitted to the client device(s) (e.g., persistently, at intervals, upon user requests, etc.). In some examples, once a user opens an application and/or a graphical user interface (GUI) on a client device, one or more messages including the reports may be obtained (e.g., downloaded, retrieved, received, etc.) from the model deployment system 118 (and/or another system). For example, the data representing the reports may be stored on one or more servers associated with a system, and upon request, upon opening an application, and/or upon accessing a GUI associated with the report(s), the messages including the report(s) may be downloaded to the client device.

Once the messages are received by the client device(s), the necessary data for generating the reports may be accessible to the client device(s). For example, once received, if the application is not open and/or a GUI for viewing the reports is not open, a notification may be generated. The notification may be a push notification (e.g., a ribbon, banner, pop-up, etc.), an in-application notification (e.g., a number representative of a number of reports available for viewing, or other symbol), and/or may be another type of notification. In examples where the application and/or the GUI is open, the reports may be populated within the application and/or the GUI. The reports may include one or more visual representations thereof (e.g., charts, graphs, tables, etc.), as described in more detail herein with respect to FIGS. 4A-4F and 5-6.

In some examples, the report generator 128 may generate recommendations. For example, the recommendations may include recommended fixes for correcting biases, overfitting, and/or other false positives where features may be incorrectly labeled as important based on the explanation scores generated by the score generator 116. In some examples, the report generator 128 may recommend retraining the deployed model 124. For example, when then it is detected that that training data classifications have been over fitted, the recommendation may be to retrain the model. In some examples, the resources required to retrain a model may only be used when necessary and, still, computing and bandwidth resources may be saved by not needing to manually search for the cause of biases or feature importance explanations.

Referring now to FIG. 1B, a schematic depiction is provided illustrating an example model deployment system 118 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The model deployment system 118 may include, among other things, a raw input data store(s) including raw input data 120, an input data store(s) including preprocessed input data 122 (e.g., after preprocessing the raw input data 120), the deployed model 124, the prototype generator 112, the distance component 114, the score generator 116, a contribution determiner 126, and/or a report generator 128. Although the prototype generator 112, the distance component 114, and the score generator 116 are labeled with the same reference number in both FIG. 1A and FIG. 1B, this is not intended to be limiting. In some examples, the model training system 102 and the model deployment system 118 may include separate prototype generators, distance components, score generators, and/or report generators. In addition, as described herein, in some examples the trained model 110 may be the same as the deployed model 124, while in other examples, the trained model 110 may be used to generate the deployed model 124. The model deployment system 118 (and the components and/or features thereof) may be implemented using one or more computing devices, such as the computing device 1100 of FIG. 11, described in more detail below.

As mentioned above, the deployed model 124 may correspond to the trained model 110 after the trained model 110 has been deployed in a computing system and/or application. In particular, classifications made using the deployed model 124 may be used to power downstream applications and/or services.

The raw input data 120 may be similar to the raw training data 104, except that the raw input data 120 is input into the deployed model 124. For example, the raw input data 120 may include any type of raw data that may be input into the deployed model 124 to generate output data. The raw input data 120 may be collected, generated, and/or obtained from any number of sources, such as files, databases, data stores, sensors, and/or other sources. In some examples, the raw input data 120 may be used directly by the deployed model 124 (e.g., with no or minimal preprocessing), such as when the deployed model 124 is a convolutional neural network. In such examples, the input data store(s) and the accompanying preprocessed input data 122 may not be included in the model deployment system 118. In some examples, a combination of the raw input data 120 and the preprocessed input data 122 may be used by the deployed model 124 to generate the output data. In other examples, the deployed model 124 may only use the preprocessed input data 122 for generating the output data. In other words, the raw input data 120, the preprocessed input data 122, or a combination thereof may be used by the deployed model 124 to generate the output data.

The preprocessed input data 122 may include the raw input data 120 after preprocessing. For example, similar to described above with respect to the raw training data 104 of the model training system 102 of FIG. 1A, data preprocessing may be performed by the model deployment system 118 to convert the raw input data 120 into a clean (e.g., useable) data set (e.g., the preprocessed input data 122).

In some examples, after preprocessing, and similar to the raw training data 104 (and/or the training data 106) of the model training system 102 of FIG. 1A described above, the raw input data 120 (and/or the preprocessed input data 122) may undergo data wrangling (or data munging).

The deployed model 124 may be generated, at least in part, by the training component 108 of the model training system 102 using the raw training data 104 and/or the training data 106. As described above, the deployed model 124 may be the trained model 110, may be one of the trained models 110 (e.g., where A/B testing was performed), and/or may be the trained model 110 after additional accuracy checking, retraining, in-deployment training (e.g., continuous training during deployment), and/or the like. The trained model 110 may include one or more models, such A/B models that are tested.

The deployed model 124 may be analyzed by the prototype generator 112, the distance component 114, and/or the score generator 116 to generate the performance metrics (e.g., explanation scores) of the deployed model 124. The performance metrics of the deployed model 124 may be calculated similarly to the performance metrics of the trained model 110, described herein. In addition, by using the score generator 116 to compare the performance metrics of the trained model 110 to performance metrics of the deployed model 124, the model deployment system 118 may automatically identify performance anomalies of the deployed model 124. For example, during deployment the deployed model 124 could receive additional updates or training and it may be desirable to ensure that the model still performs like the model did prior to deployment, in one or more respects.

In these and other cases, the score generator 116 may determine a difference between a global explanation score for a feature(s) for the trained model 110 and a global explanation score for the feature(s) for the deployed model 124. Where the model deployment system 118 determines the difference exceeds a threshold value, or otherwise detects an anomaly using the scores for the different versions of the model, the model deployment system 118 may use the report generator 128 to generate a report and/or notification as described herein. A similar approach may be used for one or more local explanation scores.

Now referring to FIG. 2A, FIG. 2A is a block diagram depicting an example of the model training system 102 of FIG. 1A. The model training system 102 may include the prototype generator 112, the distance component 114, the score generator 116, the report generator 128, the data store(s) 204, and/or additional components.

The data store(s) 204 may include the raw training data store(s) of FIG. 1A, the training data store(s) of FIG. 1A, and/or other data store(s), such as data store(s) for storing training output data 206. The data store(s) 204 may include the trained model 110, the training output data 206, the raw training data 104, the training data 106, and/or other data (e.g., data representative of the performance of the trained model 110).

The training output data 206 may include outputs (e.g., classification or predictions) of the trained model 110. For example, when referencing output data of the trained model 110 herein, the training output data 206 may be included in this output data. In some examples, performance metrics (e.g., a critic fraction, local explanation scores, global explanation scores, etc.) may be calculated for the training output data 206. These performance metrics may then be compared to the performance metrics for the output data 212 (FIG. 2B) to detect bias, overfitting, etc.

Figure 2B:
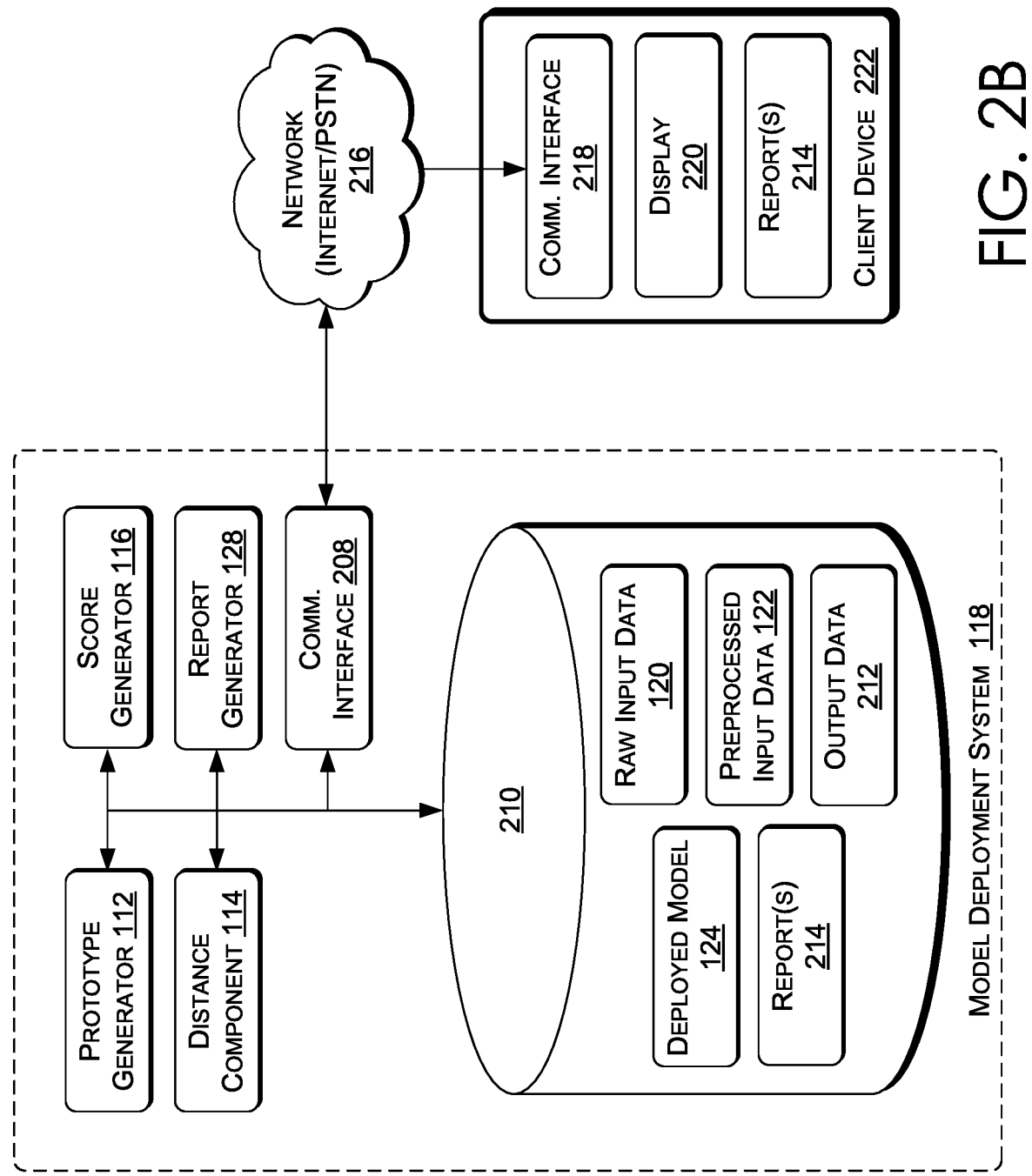
FIG. 2B is a block diagram depicting an example of a model deployment system in accordance with some embodiments of the present disclosure.

FIG. 2B is a block diagram depicting an example of the model deployment system 118 of FIG. 1B. The model deployment system 118 may include the prototype generator 112, the distance component 114, the score generator 116, the report generator 128, a data store(s) 210, and/or additional components or features.

The data store(s) 210 may include the raw input data store(s) of FIG. 1B, the preprocessed input data store(s) of FIG. 1B, and/or other data store(s), such as data store(s) for storing the output data 212. The data store(s) 210 may include the deployed model 124, report(s) 214, the raw input data 120, the preprocessed input data 122, output data 212, and/or other data.

The output data 212 may include outputs of the deployed model 124. For example, when referencing output data of the deployed model 124 herein, the output data 212 may be included in this output data (e.g., classifications). In some examples, performance metrics (e.g., a critic fraction, local explanation scores, global explanation scores, etc.) may be calculated for the output data 212. These performance metrics may then be compared to the performance metrics for the training output data 206 (FIG. 2A) to detect bias, overfitting, etc.

The communication interface 208 may include one or more components, features, modules, and/or the like for communicating over one or more networks (e.g., the Internet, local area networks (LANs), wide area networks (WANs), low power wide area networks (LPWANs), cellular networks (e.g., LTE, 4G, 5G, etc.), public switched telephone networks (PSTN), Internet of things (IoT) networks (e.g., z-wave, ZigBee, etc.), and/or other network types.

The model deployment system 118 may be connected (e.g., communicatively coupled) to the network (Internet/PSTN) 216 via the communication interface 208. The model deployment system 118 may communicate with the model training system 102, the client device(s) 222, and/or one or more other systems or devices. The model deployment system 118 may transmit one or more messages (e.g., signals) to the client device(s) 222, where the messages include the report(s) 214 and/or data for generating the report(s) 214. The model deployment system 118 may further transmit other data for use by the client device(s) 222 (e.g., for use by an application associated with training, deploying, and/or monitoring the performance of one or more machine learning models).

The client device(s) 222 may include one or more of a smart phone, laptop computer, desktop computer, tablet computer, wearable device (e.g., a smart watch, intelligent eye glasses, etc.), smart-home device, such as smart-home devices including digital personal assistants (e.g., AMAZON ECHO, GOOGLE HOME, etc.), and/or any other type of device. In some examples, the client device(s) 222 may include some or all of the features and functionality of the computing device 1100 of FIG. 11, described below.

The client device(s) 222 may include a communication interface 218, similar to the communication interface 208, for communication with one or more other devices and/or systems. The client device(s) 222 may receive the report(s) 214 and/or other data and information related to input data, output data, and/or performance of the trained model 110, the deployed model 124, and/or any other machine learning models from the model deployment system 118, the model training system 102, other client device(s) 222, and/or other devices and systems.

The client device(s) 222 may include one or more applications for presenting information (e.g., the report(s) 214) to the user. The application(s) may output the information via the display 220. The application(s) may include one or more graphical user interfaces (GUIs) for viewing, interacting with, and/or navigating through the report(s) 214 and/or information generated by the model deployment system 118, the model training system 102, other client device(s) 222, and/or other devices or systems.

Although the model training system 102 and the model deployment system 118 are illustrated as separate systems, this is not intended to be limiting. For example, the model training system 102, the model deployment system 118, and/or one or more other systems may be the same system, may share one or more features and/or components, and/or may otherwise be combined. In addition, although the model deployment system 118 is illustrated as being connected to the network 216 and a client device 222, this also is not intended to be limiting. For example, the model training system 102, the model deployment system 118, and/or one or more other systems may be connected to (e.g., communicatively coupled to) the network 216 and/or the client device 222 (and/or other client devices). In addition, the model training system 102, the model deployment system 118, and/or one or more other systems may be connected to each other via the network 216 (e.g., communicatively coupled). As such, the model training system 102 may include a communication interface, similar to the communication interface 208 of the model deployment system 118.

An example of data points that may be inputs to a machine learning model (e.g., the trained model 110 or the deployed model 124) and corresponding classifications made using the machine learning model based on those data points are illustrated with respect to FIG. 3A. FIG. 3B is used to illustrate corresponding prototypes of a prototype model that the prototype generator 112 may generate/determine based on the data points of FIG. 3A. FIG. 3A is a schematic diagram of a machine learning model (e.g., a Random Forest model) output of classifications within vector space 300 for corresponding data points, according to some embodiments. The vector space 300 includes various data points (e.g., data point 307) and various classes (e.g., forming Gaussian quantiles clusters)-class 303-1, 303-2, 301-1, and 301-2. In some examples, FIG. 3A represents data points and corresponding classifications for a trained machine learning model (e.g., the trained model 110). Alternatively or additionally, in some examples FIG. 3A represents the data points and corresponding classifications for a deployed machine learning model (e.g., the deployed model 124). Although FIG. 3A (and FIG. 3B) describes a particular quantity of classes with particular dimensions within a particular vector space (also known as feature space) format, it is understood that any suitable quantity of classes, dimensions, and output representation may exist. Accordingly, FIGS. 3A and 3B are illustrative only.

FIG. 3A illustrates a representation of a non-monotonic distribution of data points within respective classes, although it is understood that aspects of the present disclosure can use monotonic distributions. FIG. 3A illustrates two overall classes—301 and 303. In various examples, class 303-1 and 301-2 may represent different clusters or subclasses of the same class or of different classes.

FIG. 3B is a schematic diagram of a prototype model output of classifications within vector space 300-1, according to some embodiments. In some examples, each of the data points in the vector space 300-1 is a prototype that represents a condensed or compressed view or subset of the data 104, 106, 120 and/or 122. Each prototype may represent a larger set or region of data points (e.g., within the vector space 300) shown in FIG. 3A. For example, referring back to FIG. 3A, each of the set of data points 305-1 (represented within the dotted sphere) may be "covered" by or mapped to prototype data point 305-2 of FIG. 3B such that only prototype data point 305-2 may be included in the prototype model, as opposed to all data points in the set of data points 305-1. In this way a threshold neighborhood of original data points may be mapped to the same prototype data point such that only the same prototype data point is analyzed to determine behavior of the machine learning model.

Each original data point applied to a machine learning model may be mapped to a corresponding prototype. Examples of algorithms for covering (e.g., mapping or compressing) each of these original data points into a prototype are described in more detail herein. The prototypes together may be representative of the original data points in that the prototype data points may inherently maintain the output distribution as closely as possible to that of the original data points (e.g., as illustrated within the vector space 300 of FIG. 3A), have local variability in both label space and vector space similar to the original data points, provide instance-based explanations similar to the original data points, have local sensitivity, offer a global view, and/or have effective interpretable meaning in terms of representativeness of the original data points and machine learning model.

From a class perspective, each class within the vector space 300-1 includes prototypes that, together, may be representative of an entire corresponding class within vector space 300 of FIG. 3A. For example, the class 301-1 in FIG. 3A represents the same class or cluster of class 301-1 in FIG. 3B, except that the class 301-1 of FIG. 3B is represented by a group of prototypes instead of all of the data points. Accordingly, each group or class of prototypes may represent a sub-group or otherwise compressed or condensed representation of a corresponding class of data points within an original machine learning model.

FIG. 3B additionally illustrates prototypes that may be used for generating local and global explanation scores based at least in part on distances between particular prototypes and received test points, as described herein. A test point 321 may be a data point that represents a vector of features at test time. For example, the test point 321 can correspond to a particular plant input vector, and the features can be petal width, color, height, weight, etc. The test point 321 is various examples may be a prototype, a data point from FIG. 3A, or a data point not included in FIG. 3A. Various examples contrast the test point 321 with its Allies and Adversaries to understand the model's reasoning for classification. This comparison may result in explanations based on similarity and counterfactual arguments with an Ally and Adversary respectively. Given a particular data point $x_i$ and its prediction classification $y_i$, a nearest Ally and Adversary may be located and contrasted to identify and score features which may be more relevant for a model to make a prediction.

For example, referring to FIG. 3B, it may be determined (e.g., using the distance component 114) that the prototype 323 is closest to the test point 321 within the class 301-1, compared to all of the other prototypes in the vector space 300-1. Responsively, the data point 323 may be identified as an Ally. Further, it may be determined (e.g., by the distance component 114) that the prototype data point 325 is closest to the test point 321 in the different class 303-1, compared to all of the other prototypes in vector space 300-1. Responsively, the prototype 325 may be identified as an Adversary.

In these examples, the closest prototype to the test point but of a different class than the test point is computed. In various examples, computing the Adversary includes locating the nearest decision boundary (e.g., the dotted line associated with the class 301-1), as described in more detail below.

In various examples, when the Allies and Adversaries are identified, it may then be determined whether the test point 321 is closer to the ally or adversary and scoring may be proportionally based on the closeness in distance. In various examples, the closer a data point is to an Ally, the higher the score may be for the test point 321 and associated features. Conversely, the closer the test point 321 is to an Adversary, the lower the score may be. For example, referring to FIG. 3B, the test point 321 is much closer in distance to the Ally 323 than the Adversary 325. Accordingly, the Ally 323 and corresponding features may be scored higher. For a given test point, the nearest point (an Ally) from the same class may be a representative example from a dataset (e.g., within vector space 300) for which the model behaves similarly in comparison to the test point. For the given test point, the nearest point in a different class (an Adversary) may serve as a counter factual example or difference from the test point which makes the model predict differently or make a different classification. The process of identifying Allies and Adversaries and computing distances within a particular class can be repeated for some or each class within a data set. For example, the same processes described with respect to the class 303-1 in FIG. 3B. Accordingly, a distance can be determined between the test point 331 and ally 333 and the adversary 335. While the examples were provided within the same overall classes 303-1 and 301-2, Ally's and Adversaries may be determined across the overall classes 303-1 and 301-2 for a given test point.

In some examples, the position of a test point in dimensional vector space may allow additional inferences to be made for what features of those test points were primarily responsible for the precise positioning in vector space. Accordingly, each feature of a vector or data point is scored and ranked in order of classification importance based on the data point's positioning in vector space, which is described in more detail below. Both a local explanation score and global explanations score for the test point may be responsively generated, which is described in more detail below (e.g., in FIGS. 9 and 10).

Figure 4A:
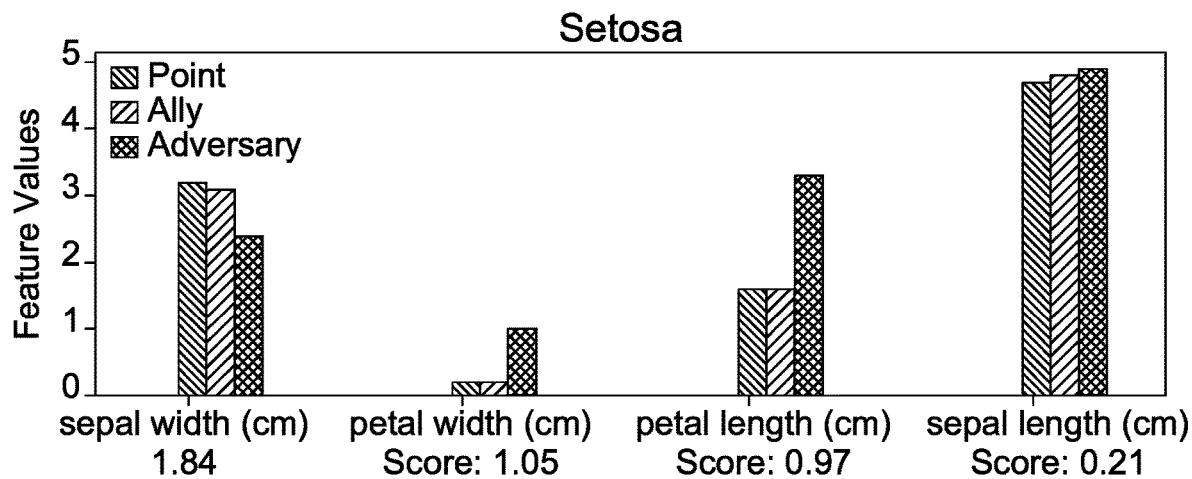
FIGS. 4A-4C illustrate bar graph diagrams that represent various local explanation scores for different features of different data points, in accordance with some embodiments of the present disclosure.
Figure 4B:
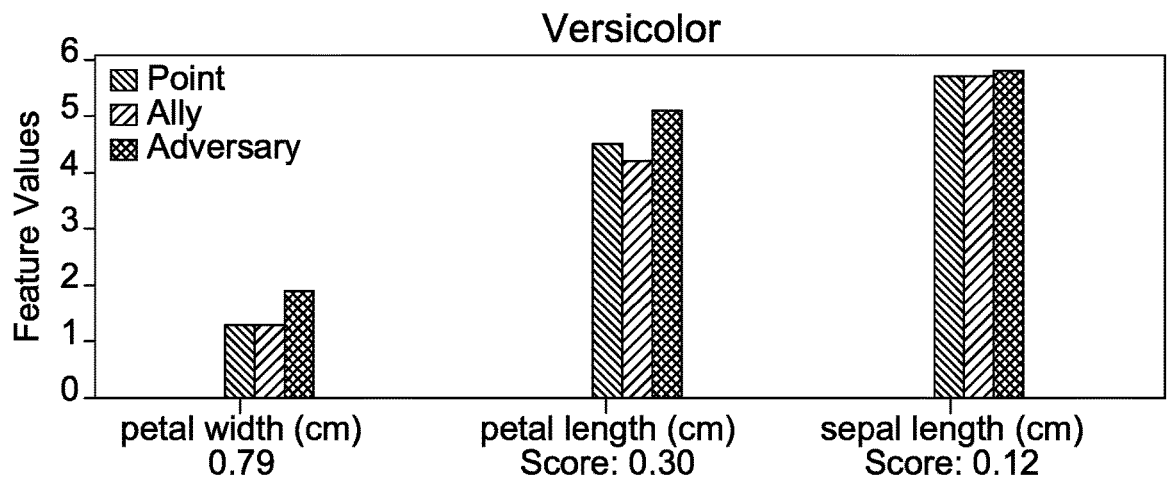
Figure 4C:
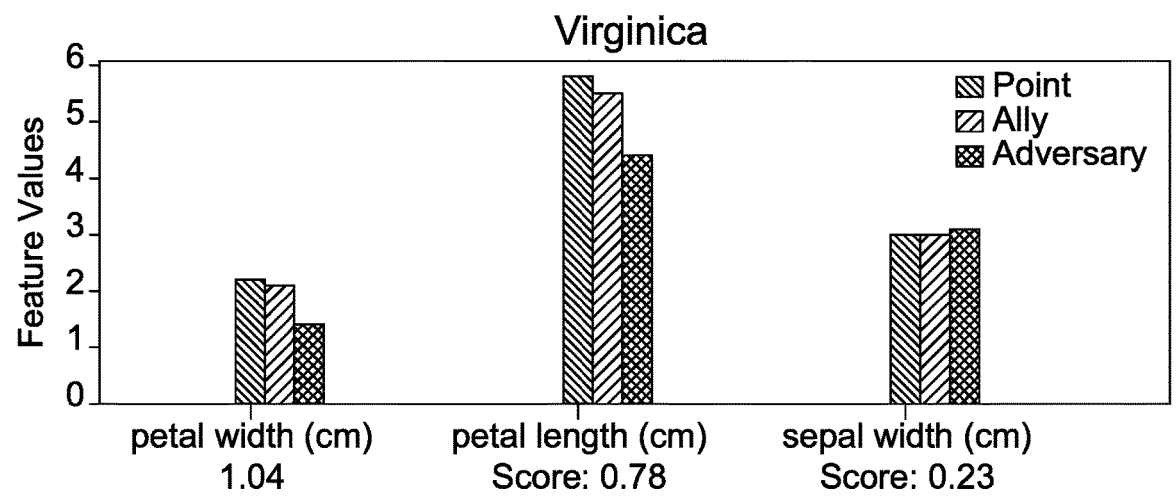
Figure 4D:
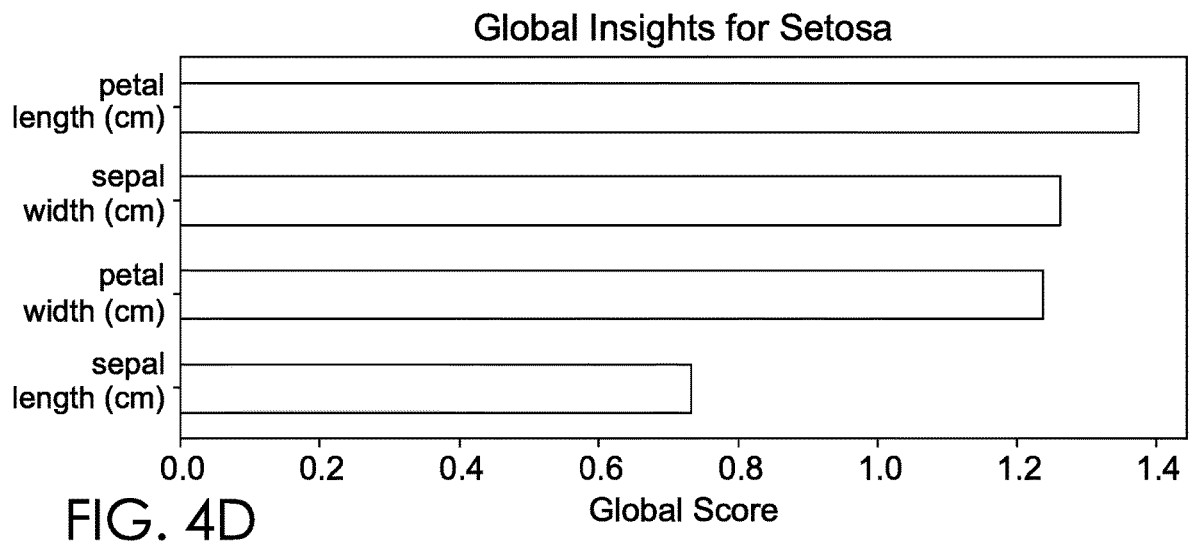
FIGS. 4D-4F illustrate bar graph diagrams that represent various global explanation scores for different features of models in accordance with some embodiments of the present disclosure.
Figure 4E:
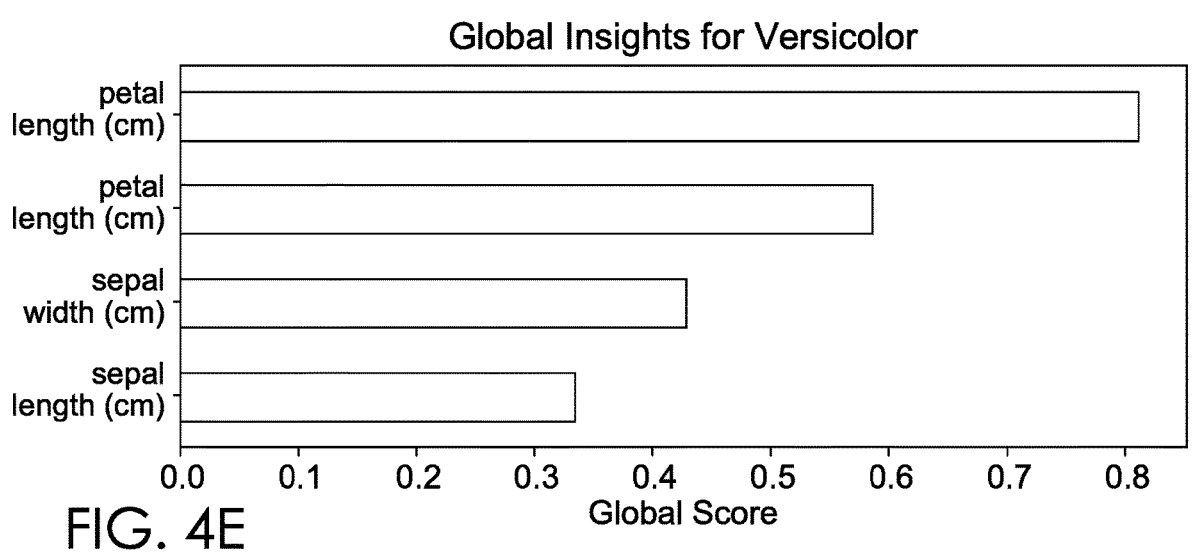
Figure 4F:
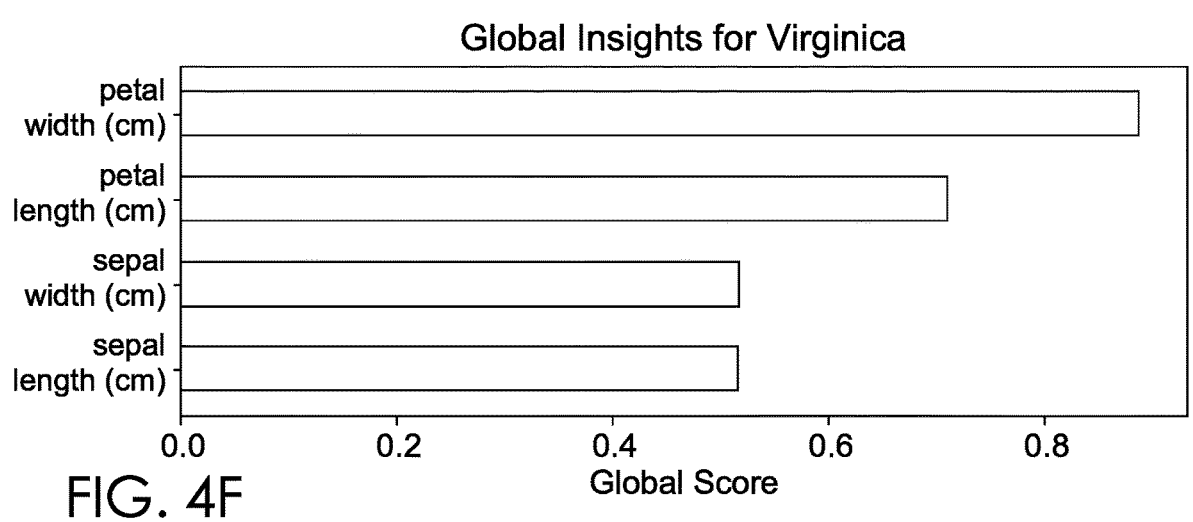

FIGS. 4A-4C illustrate bar graph diagrams that represent various local explanation scores for different features of different data points, according to embodiments. FIGS. 4D-4F illustrate bar graph diagrams that represent various global explanation scores for different features of models in accordance with some embodiments of the present disclosure. FIGS. 4D-4F may correspond to reports generated using the report generator 128, which may be displayed on a client device.

Although FIGS. 4A-4C (and FIGS. 4D-4F) represent particular data points, classes, values, scores, and features, it is understood that any suitable data point, class, value, score, and feature may exist. Illustrated are three different test data points or vectors—Setosa, Versicolor, and Virginica—in an Iris dataset. Each of these data points correspond to vectors of features. For example, for the data point or class of Setosa, there are four features-sepal width, petal width, petal length, and sepal length. Each of these features have particular values in centimeters and are associated with local explanation scores based at least in part on the distance or difference in a particular test point is with respect to corresponding Ally and Adversaries.

In some examples, once an Adversary and Ally are identified for a given test point, the various features of the test point can be extracted or located for which the test point is closer to the Ally than the Adversary, which is described in more detail herein. In some examples, scores for these features may be based on computing the differences in of individual feature values. For example, according to FIG. 4A, the sepal width local explanation score of 1.85 is the highest among the local explanation scores for each feature of the Setosa data point because the test point feature value in sepal width (which is just over 3 cm) is identical to the ally feature value and the difference in value between the test point value and the adversary is greater compared to the other test point values and adversary features of the different features. Likewise, the sepal width local explanation score of 0.24 is the lowest among the local explanation scores for each feature of the Setosa data point because the test point feature value in the length (over 4 cm), while it is identical to the ally feature value, this test point feature is also relatively close in value to the adversary feature value. The specific generation of these local explanation scores are described in more detail herein.

FIGS. 4D-4F illustrate bar graph diagrams that represent various global explanation scores for different features of different test points and classifications, according to embodiments. In some examples, FIGS. 4D-4F represent an aggregation of each of various local explanation scores, which may include particular local explanation scores in FIGS. 4A-4C. In an illustrative example, the petal length local explanation score of 0.97 for test point "Setosa" as illustrated in FIG. 4A is aggregated and weighted with other test points (e.g., prototypes) that may be classified under Setosa to generate a corresponding global explanation score of around 1.4. This demonstrates that the test point Setosa as illustrated in FIG. 4A may have been somewhat of an outlier, which has an underestimated importance of the feature "petal length" compared to the corresponding global explanation score, because locally, it was only the third highest score indicating that it was not as relevant or important to the test point being included in the Setosa class. Conversely however, when all local explanation scores are aggregated for the Setosa classification, FIG. 4D illustrates that "petal length" is the highest ranked or has the highest score, which is indicative of petal length being the most important or relevant for all test points being included in the Setosa class. Particular examples of calculations that may be made to generate a global score are described in more detail herein.

As illustrated in FIGS. 4D-4F, the global explanation scores allow inferences to be made concerning which features may be the most important with respect to being included in a particular class using multiple prototypes as test points. For example, referring back to FIG. 3B, multiple prototypes (e.g., all prototypes) can be used as test points for generating local explanation scores. For example, there may be enough prototypes used to get a representative sense of what features are most important globally for making a classification. In some examples this is accomplished by making each prototype (or data points near each prototype) or a threshold quantity of prototypes of a class a test point and responsively computing its Ally and Adversary to generate corresponding local explanation scores. These local scores can then be aggregated to form a single global explanation score for that same class.

Figure 5:
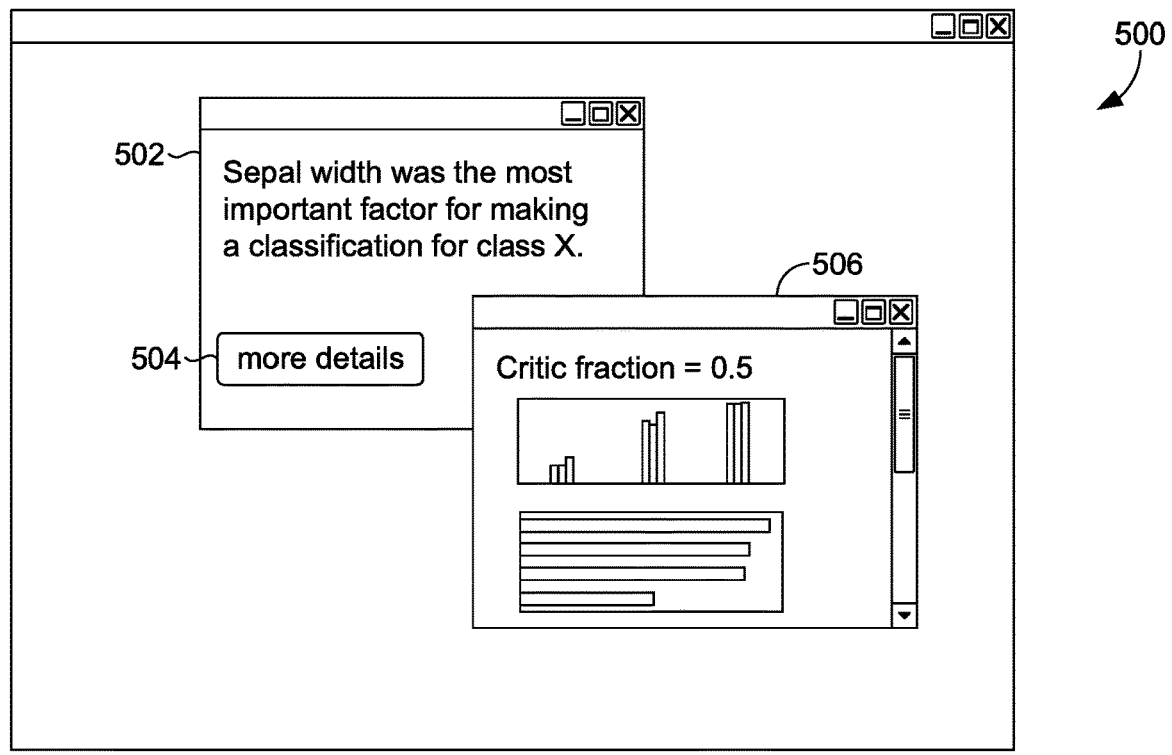
FIG. 5 is an example screenshot from a graphical user interface (GUI) for displaying and reporting machine learning model performance in accordance with some embodiments of the present disclosure.
Figure 6:
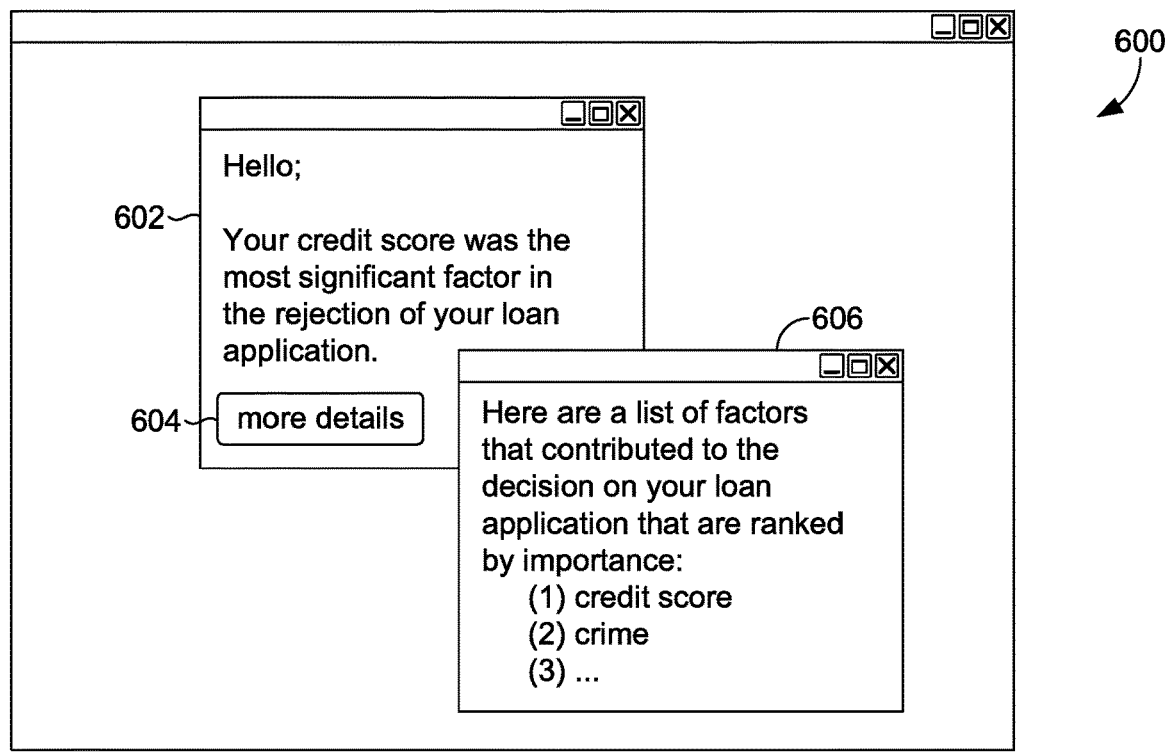
FIG. 6 is another example screenshot from a GUI for indicating a particular feature being the most important for classification with selectable elements for obtaining additional details, in accordance with some embodiments of the present disclosure.

FIGS. 5 and 6 are used to illustrate examples of user interfaces that may be provided using the report generator 128. FIG. 5 is a screenshot 500 of a user interface indicating a particular feature being the most important for a classification with selectable elements for obtaining additional details, according to particular embodiments. Although the screenshot 500 (and 600 of FIG. 6) represent particular user interface elements (e.g., windows) and feature data (e.g., sepal width) it is understood that this is representative only and as such, the user interface may include any orientation of elements with descriptions of any feature data. The screenshot 500 represents a layer of logic that is provided (e.g., by the report generator 128) to an end user such that the end user can see what features are the most relevant to a particular class or set of classes. After a machine learning model has received one or more rounds of training (e.g., via the model training system 102) and the prototypes have been generated that model the behavior of the machine learning model, including the Allies and Adversaries (e.g., as indicated in FIGS. 3A and 3B) and the local and global explanation scores have been generated (e.g., as indicated in FIG. 4A-4F), the screenshot 500 can be provided for display (e.g., over the network 216) to a client device (e.g., the client device 222).

The screenshot 500 includes the window 502 that includes a string specifying "sepal width was the most important factor for making a classification across all classes." The window 502 includes the UI element 504 (e.g., a button, icon, link, etc.) that indicates a string "more details." In response to a user selection of the UI element 504, the window 506 is provided, which provides a string indicating the misclassification rate and various visual data indicating the global and local scores. In some embodiments, each of the graphs 4A-4F (or graphs similar to these FIGS.) are provided within the window 506.

A user, such as a machine learning model developer, may desire to know all of this information provided in the user interface in order to retrain the machine learning model if necessary by inputting more training data points to tune the machine learning model. For example, the critic fraction indicates the misclassification rate achieved during the selection of prototypes. If the misclassification rate is too high, then the user can rely on the local explanation scores instead of the global explanation scores since the global explanation scores rely heavily on weights obtained during prototype selection. Additionally, if the misclassification rate is too high, the model can be retrained. Conversely, if the misclassification rate is low, then the user can rely on the global explanation scores. The critic fraction also allows users to determine whether too many data points are within one local space (as determined when generating the prototypes and weighting during global sores). If a particular local space is dense or includes a threshold quantity of data points, this indicates that the region is too complex, which means that there may be overfitting or overgeneralization problems. Consequently, the model may be retrained. The critic fraction, as it relates to generated scores, is described in more detail below.

In another example, this information in the user interface can help a user identify potential biases and build trust in the model. For instance, if a user knows that sepal width is not a defining feature of a particular iris plant, yet the data shows that sepal width was described in the user interface as being the most important factor, the user can retrain the machine learning model to provide more training data points. In some examples, the computer system (e.g., the model deployment system 118) identifies these biases, overfitting issues, and/or other associations and notifies users. For example, prior to the information being displayed to the screenshot 500 but after the prototypes and scores have been generated, the computer system can contact (e.g., over the network 216) a remote service API that has access to a corpus of data containing thousands or millions of documents of both structured and unstructured data from various sources (e.g., books, recipes, news articles, blogs, social media feeds, peer review journals, etc.). Data mining algorithms can then be performed in order to see what the corpus of data indicates is the most important factor for a particular species of an iris plant. If the feature obtained from data mining is not the same or within a threshold ranking of the feature indicated by the model for showing what is most important for determining whether a plant is a species of iris plant, then a notification can responsively be provided to the screenshot 500 indicating as such. Subsequently, the data can be retrained. Alternatively, if the feature obtained from data mining is the same or within a threshold ranking of the feature indicated by the model, then a notification can also be sent indicating as much, or no notification is sent at all.

FIG. 6 is a screenshot 600 of a user interface indicating a particular feature being the most important for a classification with selectable elements for obtaining additional details, according to particular embodiments. The screenshot 600 represents a layer of logic that is provided (e.g., by the report generator 128) to an end user so that the end user can see what features are the most relevant to a particular class or set of classes. After a machine learning model has been deployed (e.g., via the model deployment system 118) such that the data has been trained (e.g., via the model training system 102), and after prototypes have been generated, including the Allies and Adversaries (e.g., as indicated in FIGS. 3A and 3B) and the local and global explanation scores have been generated (e.g., as indicated in FIG. 4A-4F), the screenshot 600 can be provided for display (e.g., over the network 216) to a client device (e.g., the client device 222).

The screenshot 600 includes the window 602 that includes a string specifying, "Hello, your credit score was the most significant factor in the rejection of your loan application." The window 602 includes the UI element 604 (e.g., a button, icon, link, etc.) that indicates a string "more details." In response to a user selection of the UI element 604, the window 606 is provided, which includes a string specifying, "Here is a list of factors that contributed to the decision on your loan application that are ranked by importance: (1) credit score, (2) crime, (3) . . . " Each factor described corresponds to a feature of a feature vector and that has been scored both locally and globally. For example, charts similar to FIGS. 4A-4F may have been generated for this particular user using the user interface. The chart may indicated that the uppermost or highest scored feature (e.g., both locally and globally) was credit score, followed by crime.

FIG. 6 illustrates that the user need not necessarily be a developer or person desiring to view information to retrain or tune a machine learning model if necessarily. Conversely, this information can be useful for end users using particular applications in deployed machine learning models. A user, such a particular person using an application to obtain a loan, may desire to know all of the information provided in the screenshot 600 in order to see what he or she needs to work on the most in order to obtain a loan. In another example, other users, such as doctors, may desire to know what particular features (e.g., cell nucleus radius, texture, etc.) are responsible for either malignant or benign classifications for cancer. Any suitable application using deployed machine learning models may be used according to user or enterprise needs.

Figure 7:
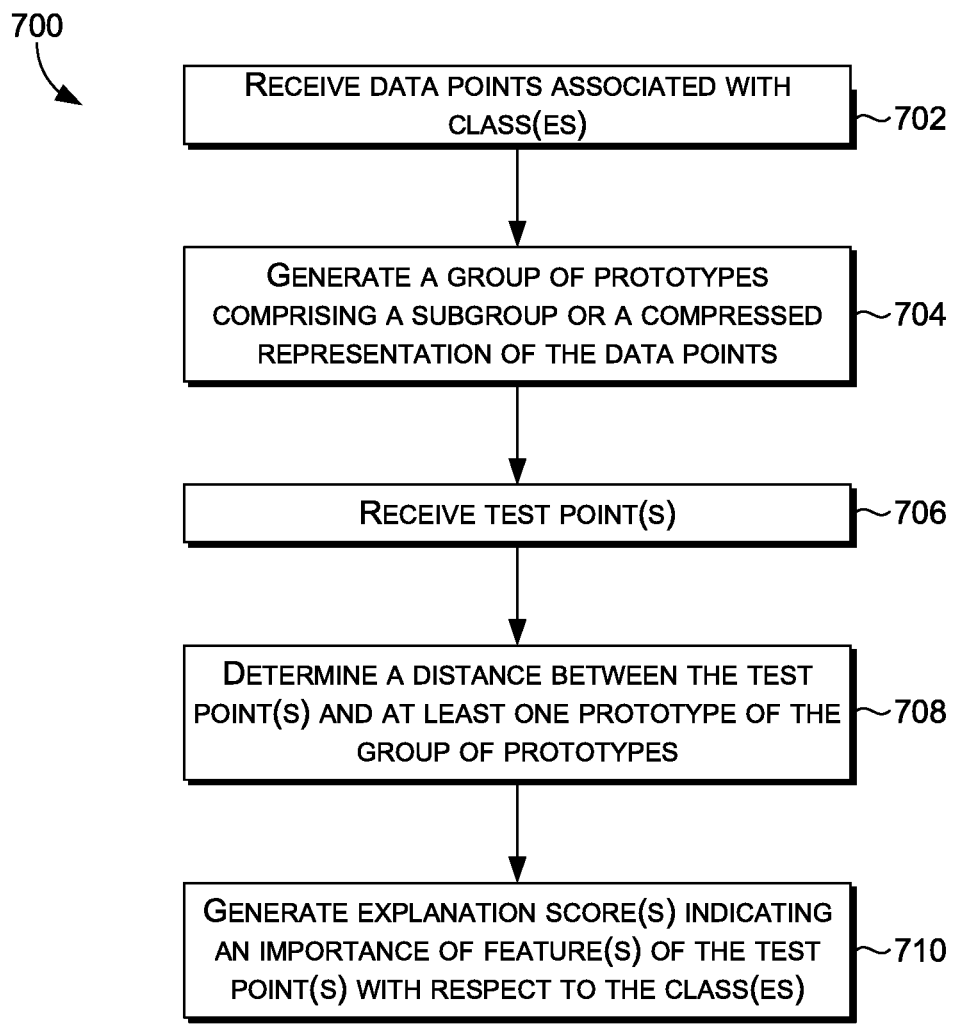
FIG. 7 is a flow diagram of an example process for generating one or more explanation scores indicating an importance of one or more features of one or more test points with respect to one or more classes, in accordance with some embodiments of the present disclosure.

FIG. 7 is a flow diagram of an example process 700 for generating one or more explanation scores indicating an importance of one or more features of one or more test points with respect to one or more classes. The process 700 (and/or any of the functionality described herein (e.g., the process 800, 900, 1000, etc.)) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer program product as described herein may perform or be caused to perform the processes 700 and/or 800 or any other functionality described herein.

Per block 702 data points are received. Each data point comprises input features and is associated with a class of outputs produced by a machine learning model using the input features. For example, each data point can be a vector of features (and feature values) represented in feature space. In an illustrative example, the data points received at block 702 may include each of the data points represented in the vector space 300 of FIG. 3A. Alternatively or additionally, the received data points may be a subset of the data points within the vector space 300, such as entire class of data points (e.g., each of the data points within the class 301-1). In some examples, the data points received at block 702 represent training data that has been processed through the trained model 110 in the model training system 102. Accordingly, the raw training data 104 and the training data 106 may have been processed through the trained model 110 such that classes have already been generated, as represented in FIG. 3A. Additionally or alternatively, the data points received at block 702 may represent data that has been processed through the deployed model 124 of the model deployment system 118. Accordingly, the data may already have been trained and deployed, such that classes have already been generated with a threshold degree of desired confidence.

Per block 704, a group of prototypes is generated (e.g., by the prototype generator 112 of FIG. 1). The group of prototypes comprise a subgroup, condensed, and/or a compressed representation of the data points received at block 702. In various examples, the group of prototypes are generated based at least in part on determining that the group of prototypes is representative of at least a data distribution or other factor of the received data points. For example, the prototypes generated at block 704 represent or are similar to the prototypes within the vector space 300-1 of FIG. 3B. The generation of prototypes are described in more detail below.

Per block 706 one or more test points are received (e.g., by a prototype model). The one or more test point correspond to one or more inputs of the machine learning model and/or the prototype model. For example, the one or more test points received can represent or be similar to the test points 321 and/or 331 of FIG. 3B. Per block 708, a distance (e.g., a Euclidian distance) is determined (e.g., by the distance component 1114) between the one or more test points and at least one prototype of the group of prototypes. For example, it can be determined what prototype is the closest to a test point that is within the same class as the test point, which may be an Ally. Additionally or alternatively, it is also determined what prototype is the closest to the same test point, but which is in a different class than the test point, which may be an Adversary. In an example, referring back to FIG. 3B, for the test point 321, distances are computed to obtain the Ally 323 and the Adversary 325. Likewise, for the test point 331, distances are computed to obtain the Ally 333 and the Adversary 335.

Per block 710, one or more explanation scores are generated (e.g., by the score generator 126) indicating an importance of one or more features of the one or more test points with respect to the one or more classes of the received data points. For example one or more local or global explanations scores are generated as illustrated in FIGS. 4A through 4F. The generation of one or more explanation scores are described in more detail below. In various examples, in response to the generating of the one or more explanation scores, user interfaces or reports can be generated (e.g., by the report generator 128) in order to provide specific feature information with respect to classes. For example, the screenshots 500 and/or 600 or similar screenshots can be provided to end users. However, screenshots or user interfaces need not be provided to users. Alternatively or additionally, for example, reports (e.g., printed statements with no UI features) may be physically printed or otherwise transmitted to a client device for the user to view.

FIG. 8 is a flow diagram of an example process 800 for generating a set of prototypes, according to some embodiments. In some examples, the process 800 represents the generating of the prototypes at block 704 of FIG. 7. In some examples, data is standardized or normalized prior to block 801. In some examples, this occurs when data is preprocessed so as to remove the mean and scale every individual feature to unit variance. In this regard, computations that use distances (e.g., finding nearest neighbors for an Ally) can be more meaningful. The process 800 corresponds to prototype generation. Given the input features (e.g., sepal width) and the model predictions $\{1, 2, \ldots, L\}^n$, a set of candidate prototypes that provide a condensed or compressed view of the data set may be selected (e.g., by the prototype generator 112). Then in some examples, a set of representative samples of interpretative value may be chosen, for example, for which a set cover optimization problem may be solved based on a greedy algorithm. The output may be a set of prototypes and their respective weights in terms of the number of points being covered by each prototype.

The description of the process 800 may use the notation $X \in \mathbb{R}^{n \times m}$ for a data matrix with n samples and m features. $y \in \{1, 2, \ldots, L\}^n$ represents a vector of model predictions. refers to a se $\mathcal{P}$ f prototypes from the data set (X). $X_l$ may refer to all points in class l. For a set A, |A| may be the cardinality of the set.

Per block 801, each training or other data point (e.g., within the training data stores of FIG. 1A or the vectors space 300) of a class is mapped or covered to a prototype candidate based on summation-based integer constraints. A "cover" may be defined as a point: $x_i \in \mathbb{R}^p$ as $\mathcal{B}(x_j) = \{x_i : d(x_i, x_j) \le \varepsilon, x_i \in \mathbb{R}^p\}$ where d(.,.) is a distance metric. $\alpha_j^{(l)} \in \{0, 1\}$ is 1 when $x_j \in P_l$ else it is 0. A prototype set or group may be $\mathcal{P}_l$ the set of prototypes from class l with various properties. The prototypes may be selected such that they cover as many training points of the class l as possible. The prototypes may also be selected to cover as few training points of other classes as possible. Lastly, few prototypes as possible may be used for a given size of covering ball (ε).

These properties may be incorporated into the formulation of a set cover optimization problem, which may first set summation-based integer constraints as follows via an integer program: minimize $$\alpha_j^{(l)}, \xi_i, \eta_i \Sigma \xi_i + \Sigma \eta_i + \lambda \Sigma \alpha_j^{(l)}$$

$$\sum_{j: x_i \in B(x_j)} \alpha_j^{(y_i)} \ge 1 - \xi_i \ \forall \ x_i \in X$$

$$\sum_{j: x_j \in B(x_j), l \ne y_i} \alpha_j^{(l)} \le 0 + \eta_i \ \forall \ x_i \in X$$

$$\alpha_j^{(l)} \in \{0, 1\} \ \forall \ j, l \ \xi_i \eta_i \ \forall \ i$$

The first two summations in the objective $\Sigma_i \xi_i + \Sigma_i \eta_i$ along with their respective set of constraints try to ensure that every point is covered by at least one prototype from the same class, and none of the prototypes from adversarial classes. The last summation in the objective $\lambda \Sigma_{j,l} \alpha_j^{(l)}$ imposes a penalty on the number of prototypes being selected. The integer program can also be rewritten as:

minimize $\alpha_j^{(l)}, \xi_i,$ $$\eta_i \sum_i \max\left\{0, 1 - \sum_{j:x_i \in B(x_j)} \alpha_j^{(y_i)}\right\} + \sum_i \sum_{j:x \in B(x_j), l \neq y_i} \alpha_j^{(l)} + \lambda \Sigma \alpha_j^{(l)}$$

s.t. $\alpha_i^{(l)} \in \{0, 1\}$

This is a modified set cover optimization problem, which may be computationally difficult. However, other algorithms may be computed to get to a feasible point for which the objective is not too far from the optimum. In order to do this, linear program relaxation and greedy solutions may be implemented.

Per block 803, the integer constraints $\alpha_j^{(l)} \in \{0,1\}$ are modified to linear constraints. The above linear constraints are relaxed to linear constraints $\alpha_j^{(l)} \in (0, 1)$. This may result in a linear program which can be solved using standard solvers, followed by randomized rounding which may help to arrive at a more feasible solution.

Per block 805, a set cover optimization approximation is generated and resolved in particular examples. In some examples, a greedy algorithm may be used such that at every step, for a given class, the prototype with the least ratio of cost to the number of newly covered points is added. In some examples, this is modified slightly towards a different algorithm as follows: define $\Delta Obj(x_j, l) = \Delta \xi(x_j, l) - \Delta \eta(x_j, l) - \lambda$ where $\Delta \xi(x_j, l) = \left|X_l \cap \left(B(x_j) \cup \bigcup_{x'_j \in P_l} B(x'_j)\right)\right|$ $\Delta \eta(x_j, l) = |B(x_j) \cap (X \setminus X_l)|$ The algorithms may start with $P_l = \emptyset$ for each class l. While $(\Delta Obj(x^*, l^*) > 0)$ find $(x^*, l^*) = \text{argmax}_{x_j, l} \Delta Obj(x_j, l)$ and $P_{l^*} \leftarrow P_{l^*} \cup \{x^*\}$. x can be set to 1/n so as to ensure that the sparsity property serves to pick between multiple solutions that do equally well on the first two properties. ($\epsilon$) may be picked using cross validation from the minimum inter-point distance until the median distance, the metric being optimized is the misclassification rate. It is understood that the equations above (and any equation specified herein) are illustrative only and that any suitable set of equations or algorithms may be utilized to complete these blocks.

Per block 807, the set of prototypes are generated based at least in part on the blocks 801, 803, and/or 805. Per block 809, the quantity of training data points in the neighborhood of each generated prototype is also identified. This quantity of data points may be known as a "weight" that each prototype is associated with. The weights may be used to generate global explanation scores, as described in more detail herein. A "neighborhood" in various examples may correspond to a threshold distance in vector space (e.g., in each dimension or direction) from a respective prototype. In an illustrative example of both the generating and the weight steps, referring back to FIGS. 3A and 3B, various calculations described above may be used to surmise that prototype 305-2 in FIG. 3B covers 15 original data points (e.g., its weight value), as illustrated by the group of data points 305-1 of FIG. 3A.

Figure 9:
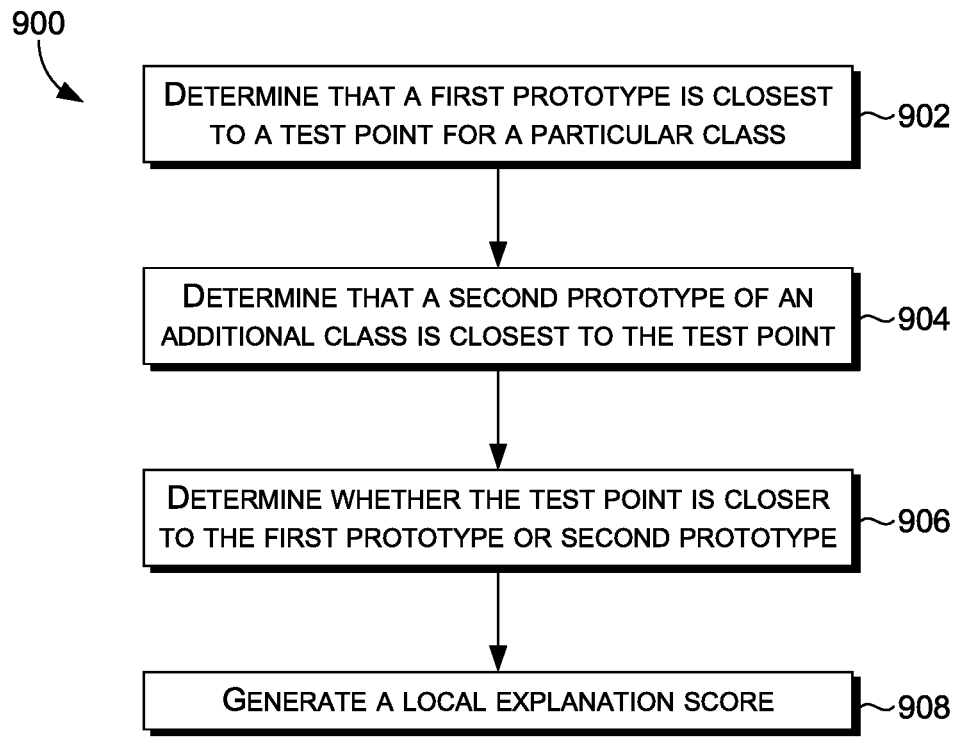
FIG. 9 is a flow diagram of an example process for generating a local explanation score, in accordance with some embodiments of the present disclosure.

FIG. 9 is a flow diagram of an example process 900 for generating a local explanation score, according to some embodiments. In some embodiments, the process 900 is included in block 710 of FIG. 7 for generating one or more explanation scores. Per block 902, it is determined class (e.g., via the distance component 114) that a first prototype is closest to a test point for a particular class (e.g., is an Ally test point). For example, referring back to FIG. 3B, it is determined that the Ally 333 is closest in vector space 300-1 to the test point 331 with respect to the class 303-1.

Per block 904, it is determined (e.g., via the distance component 114) that a second prototype of an additional class is closest to the test point (e.g., an Adversary). For example using the illustration above with respect to FIG. 3B, it is determined that the Adversary 335 is the closest prototype to the data point 331 but that which is of a different class 301-2. In some examples, finding an Adversary prototype includes finding a boundary line of the additional class borders with the class that the Ally is in. Using the nearest adversarial prototype a simple heuristic for finding the nearest decision boundary may be calculated. This can be done by uniformly sampling point on the line joining the test point and the nearest adversary. Responsively, a binary search on the predictions of the model for these points will find the nearest boundary. This is a byproduct of prototype selection (e.g., process 800 of FIG. 8) and is efficient as it does not require a complex optimization problem to be solved and is more efficient than sampling within a growing sphere which poses practical issues in higher dimensions (e.g., memory consumption, CPU taxation, etc.).

Per block 906, it is determined (e.g., by the distance component 114) whether the test point is closer to the first prototype or the second prototype. As described above, the closer a test point is to its Ally, the higher the score will be, which indicates that a particular set of features are more relevant or important with respect to a classification. Conversely, the further away the test point is to its Ally and the closer the test point is to its Adversary, the lower the score will be, which indicates that a particular set of features are less relevant or less important with respect to a classification.

Per block 908, a local explanation is generated (e.g., by the score generator 116) based at least in part in the determined distances and whether the test point or its feature values are closer to corresponding feature values of the first prototype or the second prototype. For a given test point, the nearest points from the same class (Allies) are representative examples from the dataset for which the model behaves similarly in comparison to the test point. The nearest points from Adversaries in different classes serve as counter factual examples of points and the corresponding differences from the test point, which make the model predict differently (e.g., make a different classification). The following notation will be used below to show examples of how the local explanation scores are generated in some examples. The nearest Ally to a data point is represented by $X_{al}$ and the nearest Adversary to the data point is represented by $X_{ad}$. The behavior of a model for a test point is understood by contrasting the nearest Ally of the test point with its nearest Adversary. In response to finding $X_{al}$ and $X_{ad}$, those feature values of the test point that are closer in value to the corresponding Ally than the Adversary values (and vice versa) are found. The closer in value that the feature values of the test point and Ally are to each other, the higher the local explanation score. Conversely, the further away in value these features are to each other the lower the local explanation score will be. In various examples the set of features j∈ 1, 2, . . . , m, $|x_i^j-x_{al}^j| \leq |x_i^j-x_{ad}^j| \leq |x_i^j-x_{ad}^j|$ are deemed to be relevant to the model's prediction for the test point. Therefore, the predictions of the model are explained in terms of these variables. The location explanation scores (e.g., the importance or relevance of $$f_i^j = \sqrt{\max(|x_i^j-x_{ad}|^2-|x_i^j-x_{al}|^2, 0)}$$

each feature with respect to a class) may therefore be scored as $f_i^j = \sqrt{\max(|x_i^j-x_{ad}^j|^2-|x_i^j-x_{al}^j|^2, 0)}$.

From this expression, those features that are more and less relevant for the model to make a prediction for the test point may be identified. For example, referring back to FIGS. 4A through 4C, local explanation scores for each feature of a test point may be generated, which may be based on the calculations identified above.

Figure 10:
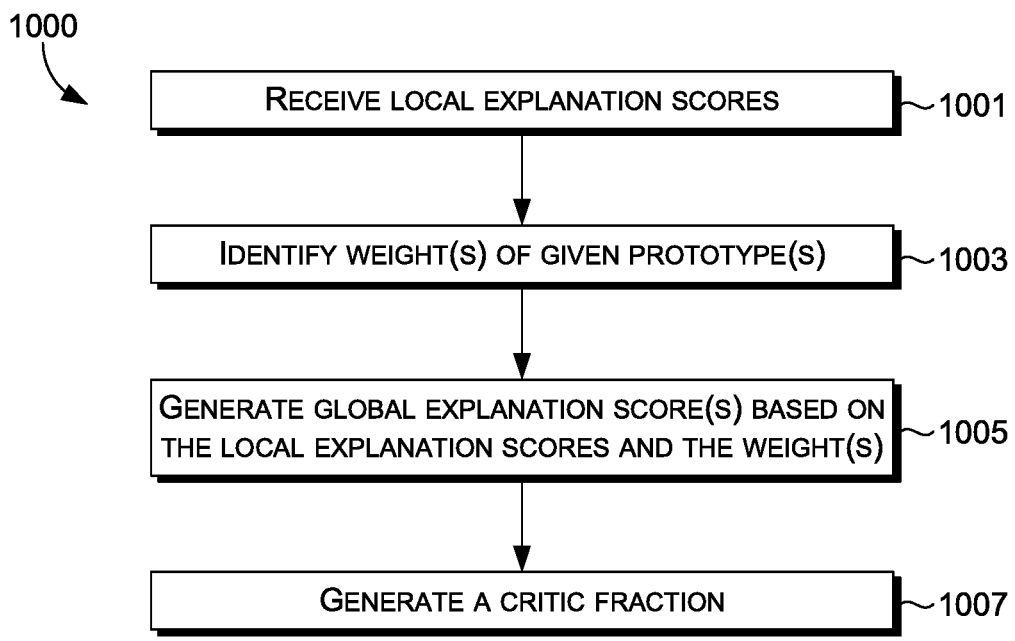
FIG. 10 is a flow diagram of an example process for generating one or more global explanation scores and generating a critic fraction, in accordance with some embodiments of the present disclosure.

FIG. 10 is a flow diagram of an example process 1000 for generating one or more global explanation scores and generating a critic fraction, according to some embodiments. In some examples, the process 1000 is included in the block 710 of FIG. 7. The global explanation scores in various examples refer to the frequency of a variable (e.g., a feature petal width) being relevant to the model's though process, which may also be dependent on the data distribution. With the assumption that prototypes are representative samples from the dataset for which the model behaves similarly in regions (e.g., neighborhoods) around them, global explanation scores provides additional insight in some examples by averaging the local explanation of prototypes or test points with their respective weights obtained as a result of prototype selection. In various examples, each prototype within a class serves as a test point and local explanations for all prototypes or test points for a given class are generated, as described below.

Per block 1001, various local explanation scores are generated. For example, referring back to FIGS. 4A through 4C, local explanation scores for each feature of the test points Setosa, Versicolor, and Virginica are calculated and received. Per block 1003, one or more weights of one or more given prototypes are identified. In some examples, the weights are identified from the weight generation at prototype generation (e.g., the process 800 of FIG. 8). As described above, a weight corresponds to a quantity of original data points (e.g., region of data points 305-1 in FIG. 3A) in the neighborhood of or are covered by a given prototype (e.g., prototype 305-2 in FIG. 3B).

Per 1005, one or more global explanation scores are generated (e.g., by the score generator 116) based at least in part on the local explanation scores and/or the weights. In some examples, under the assumption that $x_i \in P_l$, $\forall l$ are representative samples from the dataset for which the model behaves similarly in their localities, it would be expected that the local explanation scores of prototypes to be unique and sufficient for obtaining a global view of the model's reasoning. To that effect and in some examples, for every class l, a global explanation score for feature j may be computed as:

$$\text{Score}(\text{feature} = j, \text{class} = l) = \frac{\sqrt{\sum_{pr \in P_l} |B(x_{pr})| f_{pr}^{j^2}}}{\sum_{pr \in P_l} |B(x_{pr})|}$$

Where $|B(x_i)|$ may be the number of points in the cover of $x_i$. Accordingly, this computation may take a weighted average of a local explanation score for each feature of every prototype or test point (e.g., each prototype within class 301-1 of FIG. 3B). In various examples, this is a voting process over all prototypes with the weights being their region of impact in terms of the number of points being covered by a respective prototype. This proffers a global sense of how often a model classification makes use of a particular feature for reasoning. Intuitively, this is a function of the data distribution and the individual feature contributions or weights, which is reflected above. In an example illustration, global explanation scores can be generated for each feature, as represented in FIGS. 4D through 4F.

Per block 1007, a critic fraction is optionally generated. In some examples, this critic fraction uses the same critic fraction principle as described with reference to FIG. 6, which can be displayed or reported in various instances. The uncertainty of the outcome of the global explanation scores can be made more meaningful by identifying points for which the nearest neighbor prediction using prototypes differs from the model prediction. For such points, the model may behave unusually unlike any of the prototype predictions from the same class and might provide some meaning to the interpretability of the model. Accordingly, in order for a model to have even higher interpretability or explanatory power, critic fractions can be generated. A critic fraction may be equivalent to the misclassification rate of the prototype model with the model predictions as the ground truth. In some examples, calculating the misclassification rate includes identifying each original data point that is covered by a given prototype (e.g., region of data points 305-1 of FIG. 3A) and determining whether the corresponding prototype (e.g., prototype 305-2) has been classified in the same class as each data point in the cover. Accordingly, a classification output for original received data points can be compared to a classification output made for one or more corresponding prototypes. The more classifications that match, the lower the critic fraction (e.g., 0.05), meaning that interpretability is good. Conversely, the more classifications that are different or that do not match, the higher the critic fraction (e.g., 0.1), meaning that interpretability is not good or is low.

The outcome of a machine learning model can be characterized by the prototypes which belong to a particular class, as characterized by a prototype model. However, after the prototype selection process (e.g., the process 800 of FIG. 8), there may be data points for which the nearest Ally is farther away from the nearest Adversary. These points are outliers and they are points for which the model makes an unusual prediction despite the fact that they are not similar to any of the other Allies and Adversaries. This could be a consequence of noisy features and labels or irregularities in the model despite clean data. It can also be a consequence of both, which may eventually result in some unusual predictions by the model and such prediction could result in a lack of interpretability locally for such points. Therefore, more insight can be gained for interpretability from the fraction of data points that turn out to be critics. As described above, the critic fraction in some examples corresponds to the misclassification rate of the prototype model (e.g., FIG. 3B) with original model predictions (e.g., FIG. 3A) as ground truth. In general, models for which the prototype model fits well can be considered highly interpretable. In some examples, if the critic fraction mimics the original model prediction well, then global explanation scores can be relied on. To the contrary, if the critic fraction does not mimic the original model prediction well, then local explanations can be relied on.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

Figure 11:
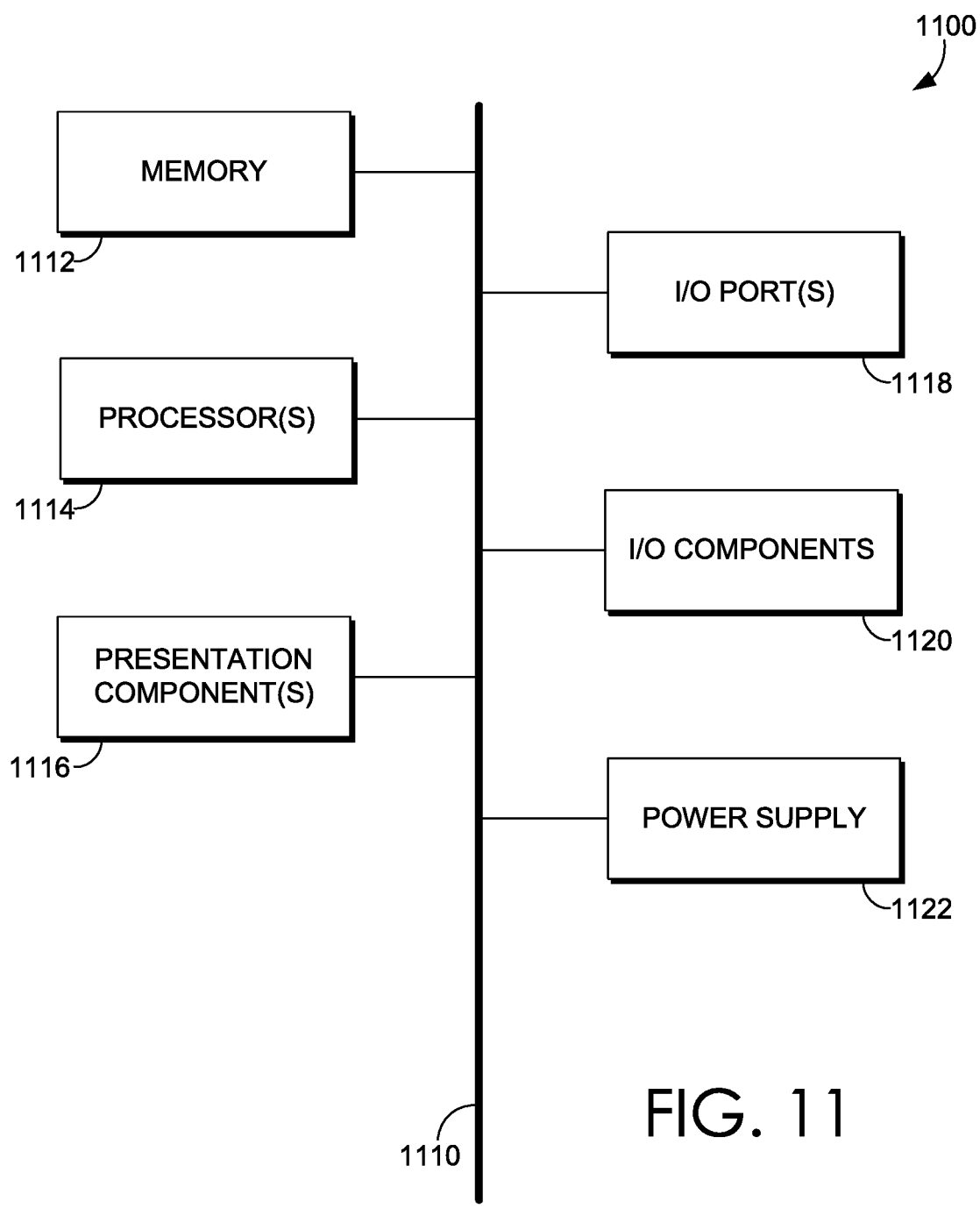
FIG. 11 is a block diagram of an example computing device for use in implementing some embodiments of the present disclosure.

With reference to FIG. 11, computing device 1100 includes a bus 1110 that directly or indirectly couples the following devices: memory 1112, one or more processors 1114, one or more presentation components 1116, input/output ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc. Then memory 1112 may include program instructions, that when executed by one or more processors, cause the one or more processors to perform any operation described herein, such as the processes 700, 800, 900, 10000 of FIGS. 7-10 and/or any of the functionality described herein.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

In various embodiments, the computing device 1100 is or is included in various components described herein. For example, the model training system 102, the model deployment system 118, and/or the client device 222 may include the components of the computing device 1100.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the search system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

As can be understood, embodiments of the present disclosure provide for, among other things, determining causal relationships between input data anomalies and output data anomalies and/or performance anomalies of machine learning models. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer system comprising:
one or more processors; and
one or more computer storage media storing computer-useable instructions that, when used by the one or more processors, cause the one or more processors to perform operations comprising:
identifying, based on user input associated with a user, a test point that was classified into a first class by a machine learning model (MLM) using values of input features of the identified test point;
generating a prototype model that includes a plurality of prototypes, wherein each prototype of the plurality of prototypes is a condensed representation of a respective set of data points that were classified into a respective class by the MLM;
based on the generating of the prototype model and based on the identified test point, selecting a first prototype that comprises a condensed representation of data points that were classified into the first class by the MLM using input features of the identified test point, and a second prototype that comprises a condensed representation of data points that were classified into a second class by the MLM using the input features of the identified test point;
computing a distance, in vector space, that a value of an input feature of the identified test point is to a value of an input feature of the first prototype of the first class, and to a value of an input feature of the second prototype of the second class;
generating, based at least in part on the computing of the distance, a local explanation score for the identified test point that is indicative of an importance of the input feature of the identified test point being classified by the MLM into the first class;
based on the generating of the local explanation score for the identified test point, generating a report indicative of the local explanation score for the identified test point; and
transmitting a message including the report to a client device associated with the user, wherein the message is configured to cause the client device to display the report in a user interface.

2. The computer system of claim 1, wherein the selecting comprises:
identifying, with respect to the input features of the identified test point, the first prototype based at least in part on the first prototype being closest in distance to the identified test point of the first class; and
identifying, with respect to the input features of the identified test point, the second prototype based at least in part on the second prototype being closest in distance to the identified test point of the second class.

3. The computer system of claim 1, wherein the one or more processors perform further operations comprising:
evaluating a value of an additional input feature of the identified test point with respect to a value of an additional input feature of the first prototype, and with respect to a value of the additional input feature of the second prototype; and
generating, based at least in part on the evaluation, an additional local explanation score for the identified test point that is indicative of an importance of the additional input feature of the identified test point being classified by the MLM into the first class.

4. The computer system of claim 3, wherein the one or more processors perform further operations comprising ranking the input feature of the identified test point and the additional input feature of the identified test point with respect to the first class using the local explanation score for the identified test point and the additional local explanation score for the identified test point, and wherein the ranking is indicated in the report.

5. The computer system of claim 1, wherein the identified test point, the first prototype, and the second prototype are selected from a group of prototypes, wherein the group of prototypes comprises a condensed representation of data points classified by the MLM using the input features of the identified test point, and wherein the one or more processors perform further operations comprising:
   determining a plurality of local explanation scores for the identified test point, wherein each local explanation score of the plurality of local explanation scores for the identified test point is for a respective prototype of the group of prototypes; and
   generating a global explanation score for the input feature of the identified test point based at least in part on the plurality of local explanation scores for the identified test point.

6. The computer system of claim 1, wherein the one or more processors perform further operations comprising generating a critic fraction based on determining, with respect to the input features of the identified test point, that the identified test point is closer in distance to the second prototype than the first prototype, and based on the second prototype being of a different class than the identified test point, and wherein the critic fraction is indicated in the report.

7. The computer system of claim 1, wherein the report includes an indication of whether to rely on the local explanation score for the identified test point or a global explanation score for the input feature of the identified test point to determine how important the input feature of the identified test point is compared to others of the input features of the identified test point to the MLM making a classification.

8. The computer system of claim 1, wherein the report includes a notification indicating that the input feature of the identified test point is primarily responsible for the identified test point being classified by the MLM into the first class.

9. The computer system of claim 1, wherein the computing comprises computing a first difference between the value of the input feature of the identified test point and the value of the input feature of the first prototype of the first class, and a second difference between the value of the input feature of the identified test point and the value of the input feature of the second prototype of the second class, and wherein the generating of the local explanation score for the identified test point is based on the first difference and the second difference.

10. A computer-implemented method performed by at least one processor, the computer-implemented method comprising:
   identifying, based on user input associated with a user, a machine learning model (MLM) that classifies data points into at least a first class or a second class using values of input features of the data points;
   generating a prototype model that includes a plurality of prototypes, wherein each prototype of the plurality of prototypes is a condensed representation of a respective set of data points that were classified into a respective class by the MLM;
   based on the generating of the prototype model, determining a group of prototypes, of the plurality of prototypes, that comprises a compressed representation of the data points;
   determining local explanation scores for the group of prototypes, wherein each local explanation score of the local explanation scores for the group of prototypes is based on computing a distance, in vector space, that a value of an input feature of a first prototype is to a value of an input feature of a second prototype that shares the first class with the first prototype;
   computing, using the local explanation scores for the group of prototypes, a global explanation score for the input feature of the first prototype that is indicative of an importance of the input feature of the first prototype to classifications made by the MLM;
   generating a report indicative of the global explanation score for the input feature of the data point; and
   transmitting a message including the report to a client device associated with the user, wherein the message is configured to cause the client device to display the report in a user interface.

11. The computer-implemented method of claim 10, wherein the computing of the global explanation score for the input feature of the data point comprises computing a weighted average value using the local explanation scores for the group of prototypes, and wherein the global explanation score for the input feature of the data point corresponds to the weighted average value.

12. The computer-implemented method of claim 10, wherein the computing of the global explanation score for the input feature of the data point weights a local explanation score for the first prototype by a quantity of the data points that correspond to the first prototype.

13. The computer-implemented method of claim 10, wherein a local explanation score for a prototype is based at least in part on:
   identifying, with respect to the input features of the data points, the first prototype based at least in part on the first prototype being closest in distance to the first prototype of the first class; and
   identifying, with respect to the input features of the data points, the second prototype based at least in part on the second prototype being closest in distance to the second prototype of the second class.

14. The computer-implemented method of claim 10, further comprising:
   determining additional local explanation scores for the group of prototypes, wherein each additional local explanation score of the additional local explanation scores for the group of prototypes is based on a value of an additional input feature of a prototype, a value of an additional input feature of the first prototype that shares the first class with the prototype, and a value of an additional input feature of the second prototype of the second class; and
   computing, using the additional local explanation scores for the group prototypes, an additional global explanation score for the additional input features of the first prototype and the second prototype that is indicative of an importance of the additional input features of the first prototype and the second prototype to the classifications made by the MLM.

15. The computer-implemented method of claim 14, further comprising ranking the input feature of the data point and the additional input feature of the first prototype with respect to the first class using the global explanation score for the input feature of the first prototype and an additional global explanation score for the additional input feature of the first prototype, wherein the ranking is indicated in the report.

16. The computer-implemented method of claim 10, wherein the local explanation scores for the group of prototypes include a local explanation score for each prototype of the group of prototypes.

17. The computer-implemented method of claim 10, further comprising determining the group of prototypes based at least in part on the group of prototypes being representative of a data distribution of the classifications made by the MLM.

18. The computer-implemented method of claim 10, further comprising computing a variability of the first class based on a quantity of the group of prototypes that are in the first class and a quantity of the group of prototypes that are in the second class, wherein the variability is indicated in the report.

19. A computer system comprising:
  a prototype generator means for generating a prototype model that includes a plurality of prototypes, wherein each prototype of the plurality of prototypes is a condensed representation of a respective set of data points that were classified into a respective class by a machine learning model (MLM;
  a distance component means for computing distances, in vector space, between a test point and a first prototype of the plurality of prototypes of a first class and a second prototype of the plurality of prototypes of a second class;
  a score generator means for generating an explanation score for an input feature based at least in part on the distances and values of the input feature for the test point, the first prototype of the plurality of prototypes of the first class, and the second prototype of the plurality of prototypes of the second class, wherein the explanation score for the input feature is indicative of how relevant the input feature is to the test point being classified into the first class by the MLM; and
  a report generator means for receiving user input associated with a user that identifies the test point to the distance component means, for generating a report indicative of the explanation score for the input feature, and for transmitting a message including the report to a client device associated with the user to cause the client device to display the report in a user interface.

20. The computer system of claim 19, wherein the score generator means is further for identifying, with respect to the input feature, the first prototype of the plurality of prototypes of the first class based at least in part on the first prototype of the plurality of prototypes of the first class being closest in distance to the test point in the first class, and identifying, with respect to the input feature, the second prototype of the plurality of prototypes of the second class based at least in part on the second prototype of the plurality of prototypes of the second class being closest in distance to the test point in the second class.

* * * * *